US012753374B2

(12) United States Patent
Sivik et al.

(10) Patent No.: US 12,753,374 B2
(45) Date of Patent: Oct. 6, 2026

(54) PRODUCT COMPRISING POLY ALPHA 1,3-GLUCAN ESTERS

(71) Applicant: The Procter & Gamble Company, Cincinnati, OH (US)

(72) Inventors: Mark Robert Sivik, Mason, OH (US); Kristine Lynn Fliter, Harrison, OH (US); Kathleen Mary Mcdonough, Mason, OH (US); Gang Si, Newcastle upon Tyne (GB); David Good, Loveland, OH (US); Michael McDonnell, Blyth (GB); Zheng-Zheng Huang, Hockessin, DE (US); Helen Lu, Wallingford, PA (US)

(73) Assignee: The Procter & Gamble Company, Cincinnati, OH (US)

( * ) Notice: Subject to any disclaimer, the term of this patent is extended or adjusted under 35 U.S.C. 154(b) by 755 days.

(21) Appl. No.: 18/074,792

(22) Filed: Dec. 5, 2022

(65) Prior Publication Data

US 2023/0116339 A1 Apr. 13, 2023

Related U.S. Application Data

(63) Continuation of application No. PCT/US2021/036513, filed on Jun. 9, 2021.

(60) Provisional application No. 63/037,030, filed on Jun. 10, 2020.

(30) Foreign Application Priority Data

Jun. 16, 2020 (EP) .................................... 20180338

(51) Int. Cl.

| | |
|---|---|
| ***C11D 17/06*** | (2006.01) |
| ***C11D 3/22*** | (2006.01) |
| ***C11D 3/386*** | (2006.01) |
| ***C11D 7/26*** | (2006.01) |
| ***C11D 17/04*** | (2006.01) |

(52) U.S. Cl.

CPC .............. *C11D 7/266* (2013.01); *C11D 17/06* (2013.01)

(58) Field of Classification Search

None

See application file for complete search history.

(56) References Cited

U.S. PATENT DOCUMENTS

| | | | |
|---|---|---|---|
| 1,130,271 | A | 3/1915 | Hammond |
| 2,251,283 | A | 8/1941 | Johnson |
| 2,474,523 | A | 6/1949 | Reynolds |
| 2,745,589 | A | 5/1956 | Daly |
| 2,777,630 | A | 1/1957 | Moberger |
| 2,836,343 | A | 5/1958 | Theodore |
| 3,116,007 | A | 12/1963 | D, Esposito et al. |
| 3,366,496 | A | 1/1968 | Bomar et al. |
| RE26,557 | E | 3/1969 | Houston |
| 3,512,699 | A | 5/1970 | Wilson |
| 4,053,100 | A | 10/1977 | Baptist |
| 4,083,455 | A | 4/1978 | Keating, Jr. |
| 4,235,735 | A | 11/1980 | Harris et al. |
| 4,304,355 | A | 12/1981 | Sykora |
| 4,441,648 | A | 4/1984 | Portsmouth |
| 4,834,255 | A | 5/1989 | Boots |
| 5,040,722 | A | 8/1991 | Fromion et al. |
| 5,103,972 | A | 4/1992 | Ackeret |
| 5,161,734 | A | 11/1992 | Ruehl et al. |
| 5,299,732 | A | 4/1994 | Armor et al. |
| 5,439,133 | A | 8/1995 | Stone |
| 5,505,374 | A | 4/1996 | Stone |
| 5,515,996 | A | 5/1996 | Stone |
| 5,518,172 | A | 5/1996 | Nanno |
| 5,551,938 | A | 9/1996 | Stone |
| 5,627,150 | A | 5/1997 | Peterson et al. |
| 5,725,144 | A | 3/1998 | Stone et al. |
| 6,604,676 | B2 | 8/2003 | Giblin |
| 6,672,474 | B2 | 1/2004 | May et al. |
| D499,022 | S | 11/2004 | Sun |
| 6,905,694 | B1 | 6/2005 | Modi |
| 7,377,385 | B2 | 5/2008 | Giannini et al. |
| 7,726,552 | B2 | 6/2010 | Chadima |
| 7,829,599 | B2 | 11/2010 | Stevens et al. |
| 7,854,771 | B2 | 12/2010 | Boutique |
| 8,443,978 | B2 | 5/2013 | Royer |
| 8,746,444 | B2 | 6/2014 | Dehlin |
| 8,997,979 | B2 | 4/2015 | Ghini |
| 9,475,605 | B2 | 10/2016 | Everett |
| 9,771,548 | B2 | 9/2017 | Nagy et al. |
| 9,783,335 | B2 | 10/2017 | Everett |
| 10,017,291 | B2 | 7/2018 | Smith |
| 10,232,976 | B2 | 3/2019 | Waddington |
| 10,442,600 | B2 | 10/2019 | Waltermire et al. |
| 10,486,849 | B2 | 11/2019 | Parkes |

(Continued)

FOREIGN PATENT DOCUMENTS

| | | |
|---|---|---|
| AT | 334276 B | 1/1976 |
| CH | 710519 A2 | 6/2016 |

(Continued)

OTHER PUBLICATIONS https://www.youtube.com/watch?v=06TdcfRR95s, pp. 3-7.
Perfumery, Practice and Principles, by Calkin and Jellinek, pub'd 1994, pp. 173-174.
Photograph of adhesive fragrance strip in Persil 3-in-1 plastic tub, No Known Date, 2 pages.
All Office Actions; U.S. Appl. No. 18/074,779, filed Dec. 5, 2022.
All Office Actions; U.S. Appl. No. 17/376,806, filed Jul. 15, 2021.
Bao X et al., "Chemical Modifications of the (1-3)-a-d-glucan from spores of Ganoderma lucidum and investigation of their physiocochemical properties and immunological activity", Carbohydrate Rese Pergamon, GB, vol. 336, No. 2, dated Nov. 8, 2021, pp. 127-140, XP004311616, ISSN: 0008-6215.

(Continued)

*Primary Examiner* — Lorna M Douyon
(74) *Attorney, Agent, or Firm* — Carolyn S. Powell; Carrie Schwartz

(57) ABSTRACT

A laundry detergent composition includes: (i) detersive surfactant; and (ii) polyalpha-1,3-glucan compounds.

12 Claims, No Drawings

(56) References Cited

U.S. PATENT DOCUMENTS

| | | | | |
|---|---|---|---|---|
| 10,822,383 | B2 | 11/2020 | Cheng et al. | |
| 10,844,142 | B2 | 11/2020 | Lu et al. | |
| D921,982 | S | 6/2021 | Gerhards et al. | |
| 11,028,187 | B2 | 6/2021 | Lu et al. | |
| 11,046,476 | B2 | 6/2021 | Whitehurst | |
| 11,066,626 | B2 | 7/2021 | Huang et al. | |
| 11,674,034 | B2 | 6/2023 | Lenges et al. | |
| 11,732,216 | B2 | 8/2023 | Sivik | |
| 12,552,916 | B2 * | 2/2026 | Briegel | C08J 5/18 |
| 2002/0052302 | A1 | 5/2002 | Clark et al. | |
| 2003/0111523 | A1 | 6/2003 | Haugan | |
| 2003/0222130 | A1 | 12/2003 | Fukushima et al. | |
| 2006/0118451 | A1 | 6/2006 | Edwards | |
| 2007/0225191 | A1 | 9/2007 | Scheibel et al. | |
| 2008/0054059 | A1 | 3/2008 | Chadima | |
| 2008/0265010 | A1 | 10/2008 | Montague | |
| 2009/0032575 | A1 | 2/2009 | D, Amato | |
| 2011/0204087 | A1 | 8/2011 | Kopulos et al. | |
| 2014/0179913 | A1 | 6/2014 | Paullin et al. | |
| 2014/0187766 | A1 | 7/2014 | Kasat et al. | |
| 2015/0232785 | A1 | 8/2015 | Paullin et al. | |
| 2015/0259439 | A1 | 9/2015 | Nambiar et al. | |
| 2015/0267155 | A1 | 9/2015 | Brooker et al. | |
| 2015/0368594 | A1 | 12/2015 | Nagy et al. | |
| 2016/0122445 | A1 | 5/2016 | Nambiar et al. | |
| 2016/0311935 | A1 | 10/2016 | Dennes et al. | |
| 2017/0001752 | A1 | 1/2017 | Ishikawa et al. | |
| 2017/0036808 | A1 | 2/2017 | Everett | |
| 2017/0298308 | A1 | 10/2017 | Labeque et al. | |
| 2018/0021238 | A1 * | 1/2018 | Huh | A61K 8/73 424/401 |
| 2018/0022498 | A1 | 1/2018 | Everett | |
| 2018/0257827 | A1 | 9/2018 | Drosos | |
| 2018/0265816 | A1 | 9/2018 | Lintula | |
| 2018/0346846 | A1 | 12/2018 | Kropf et al. | |
| 2019/0023448 | A1 | 1/2019 | Mehta | |
| 2019/0062023 | A1 | 2/2019 | Lantz | |
| 2019/0135503 | A1 | 5/2019 | De Wilde | |
| 2019/0136153 | A1 | 5/2019 | Dicosimo et al. | |
| 2019/0185893 | A1 | 6/2019 | Guan et al. | |
| 2019/0202942 | A1 | 7/2019 | Lu et al. | |
| 2019/0225737 | A1 | 7/2019 | Behabtu et al. | |
| 2019/0291917 | A1 | 9/2019 | Curcic | |
| 2019/0309096 | A1 | 10/2019 | Lu et al. | |
| 2019/0345267 | A1 | 11/2019 | Adelman et al. | |
| 2019/0390138 | A1 | 12/2019 | Sivik et al. | |
| 2020/0002646 | A1 | 1/2020 | Huang et al. | |
| 2020/0131281 | A1 * | 4/2020 | Guan | C12P 19/04 |
| 2020/0308371 | A1 | 10/2020 | Briegel et al. | |
| 2021/0047072 | A1 | 2/2021 | Ng Pak Leung et al. | |
| 2021/0071217 | A1 | 3/2021 | Paullin et al. | |
| 2021/0395648 | A1 | 12/2021 | Sivik et al. | |
| 2021/0395655 | A1 | 12/2021 | Depoot et al. | |
| 2022/0041960 | A1 | 2/2022 | Lu et al. | |
| 2022/0282071 | A1 | 9/2022 | Behabtu et al. | |
| 2023/0106704 | A1 | 4/2023 | Si et al. | |
| 2023/0116102 | A1 | 4/2023 | Sivik et al. | |
| 2023/0212325 | A1 | 7/2023 | Huang et al. | |
| 2023/0287148 | A1 | 9/2023 | Huang et al. | |
| 2024/0228911 | A1 | 7/2024 | Sivik | |

FOREIGN PATENT DOCUMENTS

| | | | | |
|---|---|---|---|---|
| CN | 1203070 | A | 12/1998 | |
| CN | 101910393 | A | 12/2010 | |
| CN | 102634033 | A | 8/2012 | |
| CN | 105481988 | A | 4/2016 | |
| DE | 9214914 | U1 | 1/1993 | |
| EP | 0157365 | A2 | 10/1985 | |
| EP | 0571711 | A2 | 12/1993 | |
| EP | 1783058 | A1 | 5/2007 | |
| EP | 3587293 | A1 | 1/2020 | |
| EP | 3753856 | A1 | 12/2020 | |
| FR | 2820718 | A1 | 8/2002 | |
| JP | 2001172678 | A | 6/2001 | |
| JP | 2018076095 | A | 4/2010 | |
| JP | 4536881 | B2 | 12/2018 | |
| WO | 2008038189 | A1 | 4/2008 | |
| WO | 2010085471 | A1 | 7/2010 | |
| WO | 2011012863 | A1 | 2/2011 | |
| WO | 2015095358 | A1 | 6/2015 | |
| WO | 2018098065 | A1 | 5/2018 | |
| WO | WO-2019164669 | A1 * | 8/2019 | C08L 67/00 |
| WO | 2019243071 | A1 | 12/2019 | |
| WO | 2020131711 | A1 | 6/2020 | |

OTHER PUBLICATIONS

CM05216F Extended EP Search Report and Written Opinion for 20180338.4 dated Aug. 13, 2020, 08 pages.

CM05216M PCT Search Report and Written Opinion for PCT/US2021/036513 dated Oct. 13, 2021,23 pages.

Siqi L Schffler et al., "Phytoglycogen Octenyl Succinate, an Amphiphilic Carbohydrate Nanoparticle and [epsilon]-Polylysine to improve Lipid oxidative stability of emulsions", Journal of agricultural and food Chemistry, vol. 58, No. 1, dated Jan. 13, 2010, pp. 660-667, XP55458256, ISSN: 0021-8561.

Unpublished U.S. Appl. No. 18/074,779, filed Dec. 5, 2022, to Mark Robert Sivik et al.

* cited by examiner

PRODUCT COMPRISING POLY ALPHA 1,3-GLUCAN ESTERS

FIELD OF THE DISCLOSURE

The present disclosure is directed towards a laundry detergent comprising a poly alpha 1,3-glucan ester.

BACKGROUND

Laundry detergent compositions need to remove a wide range of soils and provide a wide range of cleaning performance. For some laundry detergent compositions, providing stain removal performance is of high importance. More specifically, providing good stain removal performance for body soils such as sebum soil, is important. In addition, providing good whiteness performance, and especially when cleaning polyester fabric, is also important.

The present invention addresses this problem by providing a detergent composition that has good stain removal performance, especially on body soils like sebum, and good whiteness performance, especially on polyester fabric. This is important, for example, for laundry detergent compositions designed to clean sportswear. The present invention achieves this by providing a laundry detergent composition comprising a detersive surfactant and a specific poly alpha-1,3-glucan compound.

There is also a need for such polysaccharide derivatives to be readily biodegradable. The polymers of the present invention also exhibit good biodegradation performance.

US 2020/002646 relates to compositions comprising polysaccharide derivatives.

SUMMARY

The present invention relates to a laundry detergent composition comprising:

(i) detersive surfactant; and (ii) polyalpha-1,3-glucan ester compound comprising poly alpha-1,3 glucan backbone and ester group modification, wherein the poly alpha-1,3 glucan backbone:

(a) is preferably linear, (b) has less than 10% branching point, and (c) contains 6 or more glucose units, wherein the ester group modification being one or more independently selected from:

(a) an acetyl;

(b) an aryl ester group;

(c) an acyl group

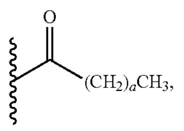

wherein a is independently 6-24; and (d) an acyl group

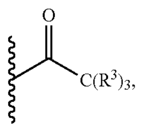

wherein $R^3$ can be independently selected from H atoms, linear alkyl groups, branched alkyl groups, cyclic alkyl groups, and aryl groups comprising from one to 24 carbon atoms, and wherein (d) is different from (a) and (c);

(e) an acyl group comprising $—CO—C_x—COOR^3$, wherein the $—C_x—$ portion of the second acyl group comprises a chain of 2 to 24 carbon atoms, and $R^3$ comprises a chain of 1 to 24 carbon, with the proviso that if (a) is present, then at least one other ester group (b), (c) (d) and/or (e) are present, and wherein the degree of substitution of the ester group modification is from 0.001 to 3.

The present invention also provides a laundry detergent composition comprising:

(i) detersive surfactant; and (ii) polyalpha-1,3-glucan compound represented by the structure:

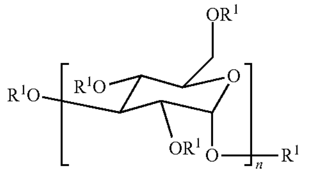

wherein:

n is at least 6;

$R^1$ is independently selected from a group comprising H and ester modification group, wherein the ester modification group being independently selected from following (a), (b), (c) or combinations:

(a) an acetyl;

(b) an aryl ester group;

(c) a acyl group

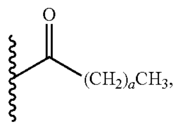

wherein a is independently 6-24; and (d) a acyl group

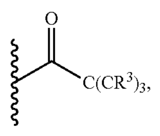

wherein $R^3$ can be independently selected from H atoms, linear alkyl groups, branched alkyl groups, cyclic alkyl groups, and aryl groups comprising from one to 24 carbon atoms; and wherein (d) is different from (a) and (c); and (e) an acyl group comprising $—CO—C_x—COOR^3$, wherein the $—C_x—$ portion of the second acyl group comprises a chain of 2 to 24 carbon atoms, and $R^3$ comprises a chain of 1 to 24 carbon, with the proviso that if (a) is present, then at least one other ester group (b), (c) (d) and/or (e) is present, and wherein the degree of substitution for the ester group is from 0.001 to 3.

DETAILED DESCRIPTION

Definitions

As used herein, the article "a" refers to one as well as more than one and does not necessarily limit its referent noun to the grammatical category of singular number.

As used herein, the terms "about" and "at or about", when used to modify an amount or value, refers to an approximation of an amount or value that is more or less than the precise amount or value recited in the claims or described herein. The precise value of the approximation is determined by what one of skill in the art would recognize as an appropriate approximation to the precise value. As used herein, the term conveys that similar values, not precisely recited in the claims or described herein, can bring about results or effects that are equivalent to those recited in the claims or described herein, for which one of skill in the art would acknowledge as acceptably brought about by the similar values.

The terms "percent by volume", "volume percent", "vol %" and "v/v %" are used interchangeably herein. The percent by volume of a solute in a solution can be determined using the formula: [(volume of solute)/(volume of solution)]×100%.

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

As used herein, "weight average molecular weight" or "Mw" is calculated as $Mw=\Sigma NiMi^2/\Sigma NiMi$; where Mi is the molecular weight of a chain and Ni is the number of chains of that molecular weight. The weight average molecular weight can be determined by techniques such as static light scattering, gas chromatography (GC), high performance liquid chromatography (HPLC), gel permeation chromatography (GPC), small angle neutron scattering, X-ray scattering, and sedimentation velocity.

As used herein, "number average molecular weight" or "Mn" refers to the statistical average molecular weight of all the polymer chains in a sample. The number average molecular weight is calculated as $Mn=\Sigma NiMi/\Sigma Ni$ where Mi is the molecular weight of a chain and Ni is the number of chains of that molecular weight. The number average molecular weight of a polymer can be determined by techniques such as gel permeation chromatography, viscometry via the (Mark-Houwink equation), and colligative methods such as vapor pressure osmometry, end-group determination, or proton NMR.

The terms "increased", "enhanced" and "improved" are used interchangeably herein. These terms may refer to, for example, a quantity or activity that is at least 1%, 2%, 3%, 4%, 5%, 6%, 7%, 8%, 9%, 10%, 20%, 30%, 40%, 50%, 60%, 70%, 80%, 90%, 100%, 125%, 150%, 175%, or 200% (or any integer between 1% and 200%) more than the quantity or activity for which the increased quantity or activity is being compared.

The terms "poly alpha-1,3-glucan", "alpha-1,3-glucan polymer" and "glucan polymer" are used interchangeably herein. Poly alpha-1,3-glucan is a polymer comprising glucose monomeric units linked together by glycosidic linkages, wherein at least about 50% of the glycosidic linkages are alpha-1,3-glycosidic linkages. Poly alpha-1,3-glucan is a type of polysaccharide. The structure of poly alpha-1,3-glucan can be illustrated as follows:

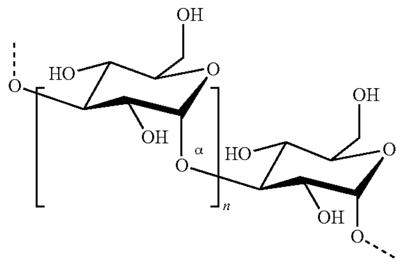

The poly alpha-1,3-glucan that can be used for preparing poly alpha-1,3-glucan ester compounds described herein can be prepared using chemical methods. Alternatively, it can be prepared by extracting it from various organisms, such as fungi, that produce poly alpha-1,3-glucan. Alternatively, poly alpha-1,3-glucan can be enzymatically produced from sucrose using one or more glucosyltransferase (gtf) enzymes (e.g., gtfJ), such as described in U.S. Pat. Nos. 7,000,000, and 9,080,195, and 8,642,757 (all three of which are incorporated herein by reference), for example.

The terms "glucosyltransferase enzyme", "gtf enzyme", "gtf enzyme catalyst", "gtf", and "glucansucrase" are used interchangeably herein. The activity of a gtf enzyme herein catalyzes the reaction of sucrose substrate to make products poly alpha-1,3-glucan and fructose. Other products (byproducts) of a gtf reaction can include glucose (where glucose is hydrolyzed from the glucosyl-gtf enzyme intermediate complex), various soluble oligosaccharides (DP2-DP7), and leucrose (where glucose of the glucosyl-gtf enzyme intermediate complex is linked to fructose). Leucrose is a disaccharide composed of glucose and fructose linked by an alpha-1,5 linkage. Wild type forms of glucosyltransferase enzymes generally contain (in the N-terminal to C-terminal direction) a signal peptide, a variable domain, a catalytic domain, and a glucan-binding domain. A gtf herein is classified under the glycoside hydrolase family 70 (GH70) according to the CAZy (Carbohydrate-Active EnZymes) database (Cantarel et al., *Nucleic Acids Res.* 37: D233-238, 2009).

The percentage of glycosidic linkages between the glucose monomer units of poly alpha-1,3-glucan used to prepare poly alpha-1,3-glucan ester compounds described herein that are alpha-1,3 is at least about 50%, 60%, 70%, 80%, 90%, 95%, 96%, 97%, 98%, 99%, or 100% (or any integer value between 50% and 100%). In such embodiments, accordingly, poly alpha-1,3-glucan has less than about 50%, 40%, 30%, 20%, 10%, 5%, 4%, 3%, 2%, 1%, or 0% (or any integer value between 0% and 50%) of glycosidic linkages that are not alpha-1,3.

Poly alpha-1,3-glucan used to produce poly alpha-1,3-glucan ester compounds described herein is preferably linear/unbranched. In certain embodiments, poly alpha-1,3-glucan has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points, such as those present in mutan polymer.

The terms "glycosidic linkage" and "glycosidic bond" are used interchangeably herein and refer to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. This linkage is illustrated in the poly alpha-1,3-glucan structure provided above. Herein, "alpha-D-glucose" is referred to as "glucose".

The terms "poly alpha-1,3-glucan ester compound", "poly alpha-1,3-glucan ester", and "poly alpha-1,3-glucan ester derivative" are used interchangeably herein. A poly alpha-1,3-glucan compound represented by the structure:

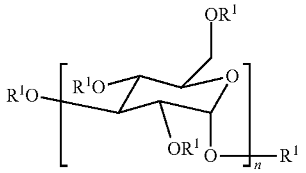

wherein:

n is at least 6;

$R^1$ is independently selected from a group comprising H and ester modification group, wherein the ester modification group being independently selected from following (a), (b), (c) or combinations:

(a) an acetyl;

(b) an aryl ester group;

(c) a acyl group

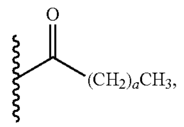

wherein a is independently 6-24; and (d) a acyl group

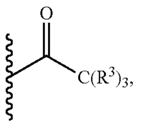

wherein $R^3$ can be independently selected from H atoms, linear alkyl groups, branched alkyl groups, cyclic alkyl groups, and aryl groups comprising from one to 24 carbon atoms; and wherein (d) is different from (a) and (c); and (e) an acyl group comprising $-CO-C_x-COOR^3$, wherein the $-C_x-$ portion of the second acyl group comprises a chain of 2 to 24 carbon atoms, and $R^3$ comprises a chain of 1 to 24 carbon, with the proviso that if (a) is present, then at least one other ester group (b), (c) (d) and/or (e) is present, and wherein the degree of substitution for the ester group is from 0.001 to 3.

Poly alpha-1,3-glucan ester compounds disclosed herein are synthetic, man-made compounds.

A poly alpha-1,3-glucan ester compound is termed an "ester" herein by virtue of comprising the substructure $-C_G-O-CO-C-$, where "$-C_G-$" represents carbon 2, 4, or 6 of a glucose monomeric unit of a poly alpha-1,3-glucan ester compound, and where "$-CO-C-$" is comprised in the acyl group.

Examples of linear "acyl group" groups herein include:

a ethanoyl group ($-CO-CH_3$), a propanoyl group ($-CO-CH_2-CH_3$), a butanoyl group ($-CO-CH_2-CH_2-CH_3$), a pentanoyl group ($-CO-CH_2-CH_2-CH_2-CH_3$), a hexanoyl group ($-CO-CH_2-CH_2-CH_2-CH_2-CH_3$), a heptanoyl group ($-CO-CH_2-CH_2-CH_2-CH_2-CH_2-CH_3$), an octanoyl group ($-CO-CH_2-CH_2-CH_2-CH_2-CH_2-CH_2-CH_3$), a nonanoyl group ($-CO-CH_2-CH_2-CH_2-CH_2-CH_2-CH_2-CH_2-CH_3$), a decanoyl group ($-CO-CH_2-CH_2-CH_2-CH_2-CH_2-CH_2-CH_2-CH_2-CH_3$), a undecanoyl group ($-CO-CH_2-CH_2-CH_2-CH_2-CH_2-CH_2-CH_2-CH_2-CH_2-CH_3$), a dodecanoyl group ($-CO-CH_2-CH_2-CH_2-CH_2-CH_2-CH_2-CH_2-CH_2-CH_2-CH_2-CH_3$), a tridecanoyl group ($-CO-CH_2-CH_2-CH_2-CH_2-CH_2-CH_2-CH_2-CH_2-CH_2-CH_2-CH_2-CH_3$), a tetradecanoyl group ($-CO-CH_2-CH_2-CH_2-CH_2-CH_2-CH_2-CH_2-CH_2-CH_2-CH_2-CH_2-CH_2-CH_3$), a pentadecanoyl group ($-CO-CH_2-CH_2-CH_2-CH_2-CH_2-CH_2-CH_2-CH_2-CH_2-CH_2-CH_2-CH_2-CH_2-CH_3$), a hexadecanoyl group ($-CO-CH_2-CH_2-CH_2-CH_2-CH_2-CH_2-CH_2-CH_2-CH_2-CH_2-CH_2-CH_2-CH_2-CH_2-CH_3$), a heptadecanoyl group ($-CO-CH_2-CH_2-CH_2-CH_2-CH_2-CH_2-CH_2-CH_2-CH_2-CH_2-CH_2-CH_2-CH_2-CH_2-CH_2-CH_3$), an octadecanoyl group ($-CO-CH_2-CH_2-CH_2-CH_2-CH_2-CH_2-CH_2-CH_2-CH_2-CH_2-CH_2-CH_2-CH_2-CH_2-CH_2-CH_2-CH_3$), a nonadecanoyl group ($-CO-CH_2-CH_2-CH_2-CH_2-CH_2-CH_2-CH_2-CH_2-CH_2-CH_2-CH_2-CH_2-CH_2-CH_2-CH_2-CH_2-CH_2-CH_3$), an eicosanoyl group ($-CO-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_3$), an uneicosanoyl group ($-CO-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_3$), a docosanoyl group ($-CO-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_3$), a tricosanoyl group ($-CO-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_3$), a tetracosanoyl group ($-CO-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_3$), a pentacosanoyl group ($-CO-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_3$), and a hexacosanoyl group ($-CO-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_2-CH_3$), for example.

Common names for the above are acetyl (ethanoyl group), propionyl (propanoyl group), butyryl (butanoyl group), valeryl (pentanoyl group), caproyl (hexanoyl group); enanthyl (heptanoyl group), caprylyl (octanoyl group), pelargonyl (nonanoyl group), capryl (decanoyl group), lauroyl (dodecanoyl group), myristyl (tetradecanoyl group), palmityl (hexadecanoyl group), stearyl (octadecanoyl group), arachidyl (eicosanoyl group), behenyl (docosanoyl group), lignoceryl (tetracosanoyl group), and cerotyl (hexacosanoyl group). The common names will be used herein when possible.

Examples of branched acyl groups include a 2-methylpropanoyl group; a 2-methylbutanoyl group; a 2,2-dimethylpropanoyl group; a 3-methylbutanoyl group; a 2-methylpentanoyl group; a 3-methylpentanoyl group; a 4-methylpentanoyl group; a 2,2-dimethylbutanoyl group; a 2,3-dimethylbutanoyl group; a 3,3-dimethylbutanoyl group; a 2-ethylbutanoyl group; and a 2-ethylhexanoyl group.

Examples of cyclic acyl groups include a cyclopropanoyl group; a cyclobutanoyl group; a cyclopentanoyl group; a cyclohexanoyl group; and a cycloheptanoyl group.

The carbonyl group (—CO—) of the acyl group is ester-linked to carbon 2, 4, or 6 of a glucose monomeric unit of a poly alpha-1,3-glucan ester compound.

Regarding nomenclature, a poly alpha-1,3-glucan ester compound can be referenced herein by referring to the organic acid(s) corresponding with the acyl group(s) in the compound. For example, an ester compound comprising acetyl groups can be referred to as a poly alpha-1,3-glucan acetate, an ester compound comprising propionyl groups can be referred to as a poly alpha-1,3-glucan propionate, and an ester compound comprising butyryl groups can be referred to as a poly alpha-1,3-glucan butyrate. However, this nomenclature is not meant to refer to the poly alpha-1,3-glucan ester compounds herein as acids per se.

"Poly alpha-1,3-glucan triacetate" herein refers to a poly alpha-1,3-glucan ester compound with a degree of substitution by acetyl groups of 2.75 or higher.

The terms "poly alpha-1,3-glucan monoester" and "monoester" are used interchangeably herein. A poly alpha-1,3-glucan monoester contains only one type of acyl group. Examples of such monoesters are poly alpha-1,3-glucan acetate (comprises acetyl groups), poly alpha-1,3-glucan propionate (comprises propionyl groups), and etc.

The terms "poly alpha-1,3-glucan mixed ester" and "mixed ester" are used interchangeably herein. A poly alpha-1,3-glucan mixed ester contains two or more types of an acyl group. Examples of such mixed esters are poly alpha-1,3-glucan acetate propionate (comprises acetyl and propionyl groups), poly alpha-1,3-glucan acetate butyrate (comprises acetyl and butyryl groups), and etc.

The term "degree of substitution" (DoS or DS) as used herein refers to the average number of hydroxyl groups substituted in each monomeric unit (glucose) of a poly alpha-1,3-glucan ester compound. Each monomeric unit has three hydroxyl groups which can be substituted with acyl groups to form an ester group. Thus, the maximum degree of substitution is 3 for each monomeric unit.

The terms "reaction", "reaction composition", and "esterification reaction" are used interchangeably herein and refer to a reaction comprising poly alpha-1,3-glucan, at least one acid catalyst, at least one acid anhydride and at least one organic acid. The reaction is substantially anhydrous. A reaction is placed under suitable conditions (e.g., time, temperature) for esterification of one or more hydroxyl groups of the glucose units of poly alpha-1,3-glucan with an acyl group from at least the acid anhydride or acid chloride, thereby yielding a poly alpha-1,3-glucan ester compound.

Herein, a poly alpha-1,3-glucan that is "acid-exchanged" has been treated with acid to remove water from the poly alpha-1,3-glucan. An acid-exchange process for producing acid-exchanged poly alpha-1,3-glucan can comprise one or more treatments in which the glucan is placed in an acid (e.g., organic acid) and then removed from the acid.

The term "acid catalyst" as used herein refers to any acid that accelerates progress of an esterification reaction. Examples of acid catalysts are inorganic acids such as sulfuric acid ($H_2SO_4$) and perchloric acid ($HClO_4$).

The term "acid anhydride" as used herein refers to an organic compound that has two acyl groups bound to the same oxygen atom. Typically, an acid anhydride herein has the formula $(R—CO)_2O$, where R is a saturated linear carbon chain (up to seven carbon atoms). Examples of acid anhydrides are acetic anhydride $[(CH_3—CO)_2O]$, propionic anhydride $[(CH_3—CH_2—CO)_2O]$ and butyric anhydride $[(CH_3—CH_2—CH_2—CO)_2O]$.

The terms "organic acid" and "carboxylic acid" are used interchangeably herein. An organic acid has the formula R—COOH, where R is an organic group and COOH is a carboxylic group. The R group herein is typically a saturated linear carbon chain (up to seven carbon atoms). Examples of organic acids are acetic acid ($CH_3$—COOH)), propionic acid ($CH_3—CH_2$—COOH)) and butyric acid ($CH_3—CH_2—CH_2$—COOH)).

The "molecular weight" of poly alpha-1,3-glucan and poly alpha-1,3-glucan ester compounds herein can be represented as number-average molecular weight (Mn) or as weight-average molecular weight (Mw). Alternatively, molecular weight can be represented as Daltons, grams/mole, DPw (weight average degree of polymerization), or DPn (number average degree of polymerization). Various means are known in the art for calculating these molecular weight measurements, such as high-performance liquid chromatography (HPLC), size exclusion chromatography (SEC), or gel permeation chromatography (GPC).

Laundry Detergent Composition.

The laundry detergent composition comprising:

i) detersive surfactant; and (ii) polyalpha-1,3-glucan compound represented by the structure:

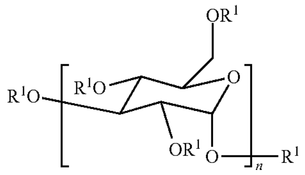

wherein:

n is at least 6;

$R^1$ is independently selected from a group comprising H and ester modification group, wherein the ester modification group being independently selected from following (a), (b), (c) or combinations:

(a) an acetyl;

(b) an aryl ester group;

(c) a acyl group

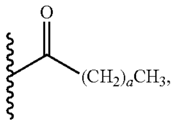

wherein a is independently 6-24; and (d) a acyl group

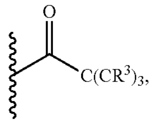

wherein $R^3$ can be independently selected from H atoms, linear alkyl groups, branched alkyl groups, cyclic alkyl groups, and aryl groups comprising from one to 24 carbon atoms; and wherein (d) is different from (a) and (c); and (e) an acyl group comprising —CO—$C_x$—$COOR^3$, wherein the —$C_x$— portion of the second acyl group comprises a chain of 2 to 24 carbon atoms, and $R^3$ comprises a chain of 1 to 24 carbon, with the proviso that if (a) is present, then at least one other ester group (b), (c) (d) and/or (e) is present, and wherein the degree of substitution for the ester group is from 0.001 to 3.

The composition may comprise optional ingredients.

It may be preferred for the laundry detergent to comprise polymer and enzyme.

Typically, the laundry detergent composition is selected from liquid laundry detergent composition, soluble unit dose laundry detergent composition and powder laundry detergent composition. The laundry detergent may also be in the form of a sheet.

The laundry detergent composition can be in the form of a liquid, a gel, a powder, a hydrocolloid, an aqueous solution, a granule, a tablet, a capsule, a single compartment sachet, a multi-compartment sachet, a single compartment pouch, or a multi-compartment pouch. In some embodiments, the laundry detergent composition is in the form of a liquid, a gel, a powder, a single compartment sachet, or a multi-compartment sachet.

The laundry detergent composition can be used for hand wash, machine wash and/or other purposes such as soaking and/or pretreatment of fabrics, for example.

The unit dose form may be water-soluble, for example, a water-soluble unit dose laundry detergent composition comprising a water-soluble film and a liquid or solid laundry detergent composition, also referred to as a pouch. A water-soluble unit dose pouch comprises a water-soluble film which fully encloses the liquid or solid detergent composition in at least one compartment. The water-soluble unit dose pouch may comprise a single compartment or multiple compartments. The water-soluble unit dose pouch may comprise at least two compartments or at least three compartments. The compartments may be arranged in a superposed orientation or in a side-by-side orientation.

A unit dose pouch is typically a closed structure, made of the water-soluble film enclosing an internal volume which comprises the liquid or solid laundry detergent composition. The pouch can be of any form and shape which is suitable to hold and protect the composition, e.g. without allowing the release of the composition from the pouch prior to contact of the pouch to water.

A liquid detergent composition may be aqueous, typically containing up to about 70% by weight of water and 0% to about 30% by weight of organic solvent. It may also be in the form of a compact gel type containing less than or equal to 30% by weight water.

The laundry detergent compositions can comprise in the range of 0.01 to 99 percent by weight of the polyalpha-1,3-glucan compound, based on the total weight of the composition. In other embodiments, the product comprises 0.1 to 10% or 0.1 to 9% or 0.5 to 8% or 1 to 7% or 1 to 6% or 1 to 5% or 1 to 4% or 1 to 3% or 5 to 10% or 10 to 15% or 15 to 20% or 20 to 25% or 25 to 30% or 30 to 35% or 35 to 40% or 40 to 45% or 45 to 50% or 50 to 55% or 55 to 60% or 60 to 65% or 65 to 70% or 70 to 75% or 75 to 80% or 80 to 85% or 85 to 90% or 90 to 95% or 95 to 99% by weight of the polyalpha-1,3-glucan compound, wherein the percentages by weight are based on the total weight of the composition.

Poly alpha-1,3-glucan Compound

The polyalpha-1,3-glucan ester compound comprises poly alpha-1,3 glucan backbone and ester group modification. The poly alpha-1,3 glucan backbone:

(a) is preferably linear, (b) has less than 10% branching point, and (c) contains 6 or more glucose units.

The ester group modification is one or more independently selected from:

(a) an acetyl;

(b) an aryl ester group;

(c) an acyl group

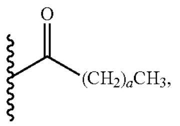

wherein a is independently 6-24; and (d) an acyl group

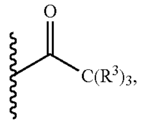

wherein $R^3$ can be independently selected from H atoms, linear alkyl groups, branched alkyl groups, cyclic alkyl groups, and aryl groups comprising from one to 24 carbon atoms, and wherein (d) is different from (a) and (c);

(e) an acyl group comprising —CO—$C_x$—$COOR^3$, wherein the —$C_x$— portion of the second acyl group comprises a chain of 2 to 24 carbon atoms, and $R^3$ comprises a chain of 1 to 24 carbon, with the proviso that if (a) is present, then at least one other ester group (b), (c) (d) and/or (e) are present, and wherein the degree of substitution of the ester group modification is from 0.001 to 3.

It may be preferred that the ester group modification is independently selected from:

(a) an acetyl;

(b) an aryl ester group;

(c) an acyl group

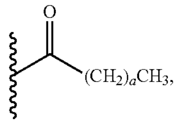

wherein a is independently 6-24; and (d) any combination thereof.

It may be preferred that the ester group modification is a combination of:

(a) an acetyl;

(b) an aryl ester group; and (c) an acyl group

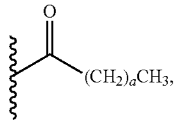

wherein a is independently 6-24.

It may be preferred that the ester group modification of the polyalpha-1,3-glucan ester compound is a combination of:

(a) an acetyl; and (b) an aryl ester group.

It may be preferred that the ester group modification of the polyalpha-1,3-glucan ester compound is a combination of:

(a) an acetyl; and (b) a benzoyl.

The polyalpha-1,3-glucan ester compound has a degree of substitution for the ester group modification of from 0.001 to 3, preferably from 0.005 to 2, more preferably from 0.01 to 1, most preferably from 0.02 to 0.8.

It may be preferred that a is independently 9-16.

The poly alpha-1,3-glucan derivatives disclosed herein comprise a backbone of poly alpha-1,3-glucan randomly substituted with ester modification along the polysaccharide backbone, such that the polysaccharide backbone typically comprises unsubstituted and substituted alpha-D-glucose rings. In embodiments wherein branches exist, the alpha-D-glucose rings of the branches may also be randomly substituted with ester modification groups. As used herein, the term "randomly substituted" means the substituents on the glucose rings in the randomly substituted polysaccharide occur in a non-repeating or random fashion. That is, the substitution on a substituted glucose ring may be the same or different [i.e. the substituents (which may be the same or different) on different atoms in the glucose rings in the polysaccharide] from the substitution on a second substituted glucose ring in the polysaccharide, such that the overall substitution on the polymer has no pattern. Further, the substituted glucose rings occur randomly within the polysaccharide (i.e., there is no pattern with the substituted and unsubstituted glucose rings within the polysaccharide).

Depend on the reaction conditions, it is also possible that the poly alpha-1,3-glucan ester compound disclosed herein comprise a backbone of poly alpha-1,3-glucan "non-randomly" substituted with ester modification groups along the polysaccharide backbone. In the situation where branches exist, it is possible the alpha-D-glucose rings of the branches could disproportionally contain more substitution than the backbone glucose monomer units which linked via alpha-1,3-glycosidic linkages. It is also possible that in certain reaction conditions the modification may exist in a block manner within the polysaccharide.

Depend on the reaction conditions, it is also possible that glucose carbon positions 1, 2, 3, 4, and 6 of poly alpha-1,3-glucan backbone are "disproportionally" substituted. For example, the —OH group at carbon position 6 is a primary hydroxyl group and may exist in an environment which have less steric hindrance, this OH group may have higher reactivity in certain reaction conditions, therefore, more substitution may happen on this position. In other reaction conditions, it may be possible that the OH group at carbon position 1, 2, 3, or 4 have higher reactivity.

Without bonded by and theory, it is believed that when degree of substitution gets lower, the situation of "disproportionally" and "non-randomly" type substitution may have higher chance to exist.

Detergent Ingredients.

The composition can further comprise at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agents, or a combination thereof. In one embodiment, the enzyme is a cellulase. In another embodiment, the enzyme is a protease. In yet another embodiment, the enzyme is an amylase. In a further embodiment, the enzyme is a lipase.

The composition may further contain one or more active enzymes. Non-limiting examples of suitable enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, amylases or a combination thereof. If an enzyme(s) is included, it may be present in the product at about 0.0001 to 0.1% by weight of the active enzyme, based on the total weight of the composition. n other embodiments, the enzyme can be present at about 0.01 to 0.03% by weight of the active enzyme (e.g., calculated as pure enzyme protein) based on the total weight of the composition. In some embodiments, a combination of two or more enzymes can be used in the composition. In some embodiments, the two or more enzymes are cellulase and one or more of proteases, hemicellulases, peroxidases, lipolytic enzymes, xylanases, lipases, phospholipases, esterases, perhydrolases, cutinases, pectinases, pectate lyases, mannanases, keratinases, reductases, oxidases, phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, amylases or a combination thereof.

In some embodiments, the composition can comprise one or more enzymes, each enzyme present from about 0.00001% to about 10% by weight, based on the total weight of the composition. In some embodiments, the composition can also comprise each enzyme at a level of about 0.0001% to about 10%, about 0.001% to about 5%, about 0.001% to about 2% or about 0.005% to about 0.5% by weight, based on the total weight of the composition.

A cellulase can have endocellulase activity (EC 3.2.1.4), exocellulase activity (EC 3.2.1.91), or cellobiase activity (EC 3.2.1.21). A cellulase is an "active cellulase" having activity under suitable conditions for maintaining cellulase activity; it is within the skill of the art to determine such suitable conditions. Besides being able to degrade cellulose, a cellulase in certain embodiments can also degrade cellulose ether derivatives such as carboxymethyl cellulose.

The cellulase may be derived from any microbial source, such as a bacteria or fungus. Chemically-modified cellulases or protein-engineered mutant cellulases are included. Suitable cellulases include, for example, cellulases from the genera *Bacillus, Pseudomonas, Streptomyces, Trichoderma, Humicola, Fusarium, Thielavia* and *Acremonium*. As other examples, the cellulase may be derived from *Humicola insolens, Myceliophthora thermophile, Fusarium oxysporum, Trichoderma reesei* or a combination thereof. The cellulase, such as any of the foregoing, can be in a mature form lacking an N-terminal signal peptide. Commercially available cellulases useful herein include CELLUSOFT®, CELLUCLEAN®, CELLUZYME® and CAREZYME® (Novozymes A/S); CLAZINASE® and PURADAX® HA and REVITALENZ™ (DuPont Industrial Biosciences), BIOTOUCH® (AB Enzymes); and KAC-500 (B)® (Kao Corporation).

Alternatively, a cellulase herein may be produced by any means known in the art, for example, a cellulase may be produced recombinantly in a heterologous expression system, such as a microbial or fungal heterologous expression system. Examples of heterologous expression systems include bacterial (e.g., *E. coli, Bacillus* sp.) and eukaryotic systems. Eukaryotic systems can employ yeast (e.g., *Pichia* sp., *Saccharomyces* sp.) or fungal (e.g., *Trichoderma* sp. such as *T. reesei, Aspergillus* species such as *A. niger*) expression systems, for example.

The cellulase in certain embodiments can be thermostable. Cellulase thermostability refers to the ability of the enzyme to retain activity after exposure to an elevated temperature (e.g. about 60-70° C.) for a period of time (e.g., about 30-60 minutes). The thermostability of a cellulase can be measured by its half-life (t½) given in minutes, hours, or days, during which time period half the cellulase activity is lost under defined conditions.

The cellulase in certain embodiments can be stable to a wide range of pH values (e.g. neutral or alkaline pH such as pH of ~7.0 to ~11.0). Such enzymes can remain stable for a predetermined period of time (e.g., at least about 15 min., 30 min., or 1 hour) under such pH conditions.

At least one, two, or more cellulases may be included in the composition. The total amount of cellulase in a composition herein typically is an amount that is suitable for the purpose of using cellulase in the composition (an "effective amount"). For example, an effective amount of cellulase in a composition intended for improving the feel and/or appearance of a cellulose-containing fabric is an amount that produces measurable improvements in the feel of the fabric (e.g., improving fabric smoothness and/or appearance, removing pills and fibrils which tend to reduce fabric appearance sharpness). As another example, an effective amount of cellulase in a fabric stonewashing composition herein is that amount which will provide the desired effect (e.g., to produce a worn and faded look in seams and on fabric panels). The amount of cellulase in a composition herein can also depend on the process parameters in which the composition is employed (e.g., equipment, temperature, time, and the like) and cellulase activity, for example. The effective concentration of cellulase in an aqueous composition in which a fabric is treated can be readily determined by a skilled artisan. In fabric care processes, cellulase can be present in an aqueous composition (e.g., wash liquor) in which a fabric is treated in a concentration that is minimally about 0.01-0.1 ppm total cellulase protein, or about 0.1-10 ppb total cellulase protein (e.g., less than 1 ppm), to maximally about 100, 200, 500, 1000, 2000, 3000, 4000, or 5000 ppm total cellulase protein, for example.

Suitable enzymes are known in the art and can include, for example, MAXATASE®, MAXACAL™, MAXAPEM™, OPTICLEAN®, OPTIMASE®, PROPERASE®, PURAFECT®, PURAFECT® OXP, PURAMAX™, EXCELLASE™, PREFERENZ™ proteases (e.g. P100, P110, P280), EFFECTENZ™ proteases (e.g. P1000, P1050, P2000), EXCELLENZ™ proteases (e.g. P1000), ULTIMASE®, and PURAFAST™ (Genencor); ALCALASE®, SAVINASE®, PRIMASE®, DURAZYM™, POLARZYME®, OVOZYME®, KANNASE®, LIQUANASE®, NEUTRASE®, RELASE® and ESPERASE® (Novozymes); BLAP™ and BLAP™ variants (Henkel Kommanditgesellschaft auf Aktien, Duesseldorf, Germany), and KAP (*B. alkalophilus* subtilisin; Kao Corp., Tokyo, Japan) proteases; MANNASTAR®, PURABRITE™, and MANNAWAY® mannanases; M1 LIPASE™, LUMA FAST™, and LIPOMAX™ (Genencor); LIPEX®, LIPOLASE® and LIPOLASE® ULTRA (Novozymes); and LIPASE P™ "Amano" (Amano Pharmaceutical Co. Ltd., Japan) lipases; STAINZYME®, STAINZYME PLUS®, NATALASE®, DURAMYL®, TERMAMYL®, TERMAMYL ULTRA®, FUNGAMYL® and BAN™ (Novo Nordisk A/S and Novozymes A/S); RAPIDASE®, POWERASE®, PURASTAR® and PREFERENZ™ (DuPont Industrial Biosciences) amylases; GUARDZYME™ (Novo Nordisk A/S and Novozymes A/S) peroxidases or a combination thereof.

In some embodiments, the enzymes in the composition can be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition herein typically comprises one or more surfactants, wherein the surfactant is selected from nonionic surfactants, anionic surfactants, cationic surfactants, ampholytic surfactants, zwitterionic surfactants, semipolar nonionic surfactants and mixtures thereof. The surfactant may be petroleum-derived (also referred to as synthetic) or non-petroleum-derived (also referred to as natural). In some embodiments, the surfactant is present at a level of from about 0.1% to about 60%, while in alternative embodiments the level is from about 1% to about 50%, while in still further embodiments the level is from about 5% to about 40%, by weight of the cleaning composition. A detergent will usually contain 0% to about 50% by weight of an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap.

The detergent composition may comprise an alcohol ethoxysulfate of the formula $R^1—(OCH_2CH_2)_x—O—SO_3M$, wherein $R^1$ is a non-petroleum derived, linear or branched fatty alcohol consisting of even numbered carbon chain lengths of from about $C_8$ to about $C_{20}$, and wherein x is from about 0.5 to about 8, and where M is an alkali metal or ammonium cation. The fatty alcohol portion of the alcohol ethoxysulfate ($R^1$) is derived from a renewable source (e.g., animal or plant derived) rather than geologically derived (e.g., petroleum-derived). Fatty alcohols derived from a renewable source may be referred to as natural fatty alcohols. Natural fatty alcohols have an even number of carbon atoms with a single alcohol (—OH) attached to the terminal carbon. The fatty alcohol portion of the surfactant ($R^1$) may comprise distributions of even number carbon chains, e.g., C12, C14, C16, C18, and so forth.

In addition, a detergent composition may optionally contain 0 wt % to about 40 wt % of a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide. The detergent composition may comprise an alcohol ethoxylate of formula $R^2$—$(OCH_2CH_2)_y$—OH, wherein $R^2$ is a non-petroleum derived, linear or branched fatty alcohol consisting of even numbered carbon chain lengths of from about $C_{10}$ to about $C_{18}$, and wherein y is from about 0.5 to about 15. The fatty alcohol portion of the alcohol ethoxylate ($R^2$) is derived from a renewable source (e.g., animal or plant derived) rather than geologically derived (e.g., petroleum-derived). The fatty alcohol portion of the surfactant ($R^2$) may comprise distributions of even number carbon chains, e.g., C12, C14, C16, C18, and so forth.

The composition can further comprise one or more detergent builders or builder systems. In some embodiments incorporating at least one builder, the compositions comprise at least about 1%, from about 3% to about 60% or from about 5% to about 40% by weight of the builder, based on the total weight of the composition. Builders include, for example, the alkali metal, ammonium and/or alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

The composition can further comprise at least one chelating agent. Suitable chelating agents include, for example, copper, iron and/or manganese chelating agents and mixtures thereof. In some embodiments in which at least one chelating agent is used, the compositions comprise from about 0.1% to about 15% or even from about 3.0% to about 10% by weight of the chelating agent, based on the total weight of the composition.

The composition can further comprise at least one deposition aid. Suitable deposition aids include, for example, polyethylene glycol, polypropylene glycol, polycarboxylate, soil release polymers such as polytelephthalic acid, clays such as kaolinite, montmorillonite, atapulgite, illite, bentonite, halloysite, or a combination thereof.

The composition can further comprise one or more dye transfer inhibiting agents. Suitable dye transfer inhibiting agents include, for example, polyvinylpyrrolidone polymers, polyamine N-oxide polymers, copolymers of N-vinylpyrrolidone and N-vinylimidazole, polyvinyloxazolidones, polyvinylimidazoles, manganese phthalocyanine, peroxidases, polyvinylpyrrolidone polymers, ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetraacetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof or a combination thereof. In embodiments in which at least one dye transfer inhibiting agent is used, the compositions can comprise from about 0.0001% to about 10%, from about 0.01% to about 5%, or even from about 0.1% to about 3% by weight of the dye transfer inhibiting agent, based on the total weight of the composition.

The composition can further comprise silicates. Suitable silicates can include, for example, sodium silicates, sodium disilicate, sodium metasilicate, crystalline phyllosilicates or a combination thereof. In some embodiments, silicates can be present at a level of from about 1% to about 20% by weight, based on the total weight of the composition. In other embodiments, silicates can be present at a level of from about 5% to about 15% by weight, based on the total weight of the composition.

The composition can further comprise dispersants. Suitable water-soluble organic materials can include, for example, homo- or co-polymeric acids or their salts, in which the polycarboxylic acid comprises at least two carboxyl radicals separated from each other by not more than two carbon atoms.

The composition can further comprise one or more other types of polymers in addition to the present poly alpha-1,3-glucan, poly alpha-1,6-glucan, or poly alpha-1,3-1,6-glucan derivatives. Examples of other types of polymers useful herein include carboxymethyl cellulose (CMC), poly (vinylpyrrolidone) (PVP), polyethylene glycol (PEG), poly (vinyl alcohol) (PVA), polycarboxylates such as polyacrylates, maleic/acrylic acid copolymers and lauryl methacrylate/acrylic acid copolymers.

The composition can further comprise a bleaching system. For example, the bleaching system can comprise an $H_2O_2$ source such as perborate, percarbonate, perhydrate salts, mono or tetra hydrate sodium salt of perborate, persulfate, perphosphate, persilicate, percarboxylic acids and salts, percarbonic acids and salts, perimidic acids and salts, peroxymonosulfuric acids and salts, sulfonated zinc phthalocyanines, sulfonated aluminum phthalocyanines, xanthene dyes which may be combined with a peracid-forming bleach activator such as, for example, dodecanoyl oxybenzene sulfonate, decanoyl oxybenzene sulfonate, decanoyl oxybenzoic acid or salts thereof, tetraacetylethylenediamine (TAED) or nonanoyloxybenzenesulfonate (NOBS). Alternatively, a bleaching system may comprise peroxyacids (e.g., amide, imide, or sulfone type peroxyacids). In other embodiments, the bleaching system can be an enzymatic bleaching system comprising perhydrolase. Combinations of any of the above may also be used.

The composition can further comprise conventional detergent ingredients such as fabric conditioners, clays, foam boosters, suds suppressors, anti-corrosion agents, soil-suspending agents, anti-soil redeposition agents, dyes, bactericides, tarnish inhibiters, optical brighteners, or perfumes. The pH of a detergent composition herein (measured in aqueous solution at use concentration) can be neutral or alkaline (e.g., pH of about 7.0 to about 11.0).

The composition can be a heavy duty (all purpose) laundry detergent composition.

In some embodiments, the detergent composition can comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., $C_8$-$C_{18}$ alkyl ethoxylated alcohols and/or $C_6$-$C_{12}$ alkyl phenol alkoxylates), where the weight ratio of anionic detersive surfactant (with a hydrophilic index (HIc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof); zwitterionic and/or amphoteric detersive surfactants (selected from a group of alkanolamine sulpho-betaines); ampholytic surfactants; semi-polar non-ionic surfactants and mixtures thereof.

The composition can optionally include a surfactancy boosting polymer consisting of amphiphilic alkoxylated grease cleaning polymers. Suitable amphiphilic alkoxylated grease cleaning polymers can include, for example, alkoxylated polymers having branched hydrophilic and hydrophobic properties, such as alkoxylated polyalkylenimines, random graft polymers comprising a hydrophilic backbone comprising monomers, for example, unsaturated $C_1$-$C_6$ carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof.

Suitable laundry detergent compositions can optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and co-polymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition polymers, include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Daltons (Da); and polymeric carboxylate (such as maleate/acrylate random copolymer or polyacrylate homopolymer). If present, soil release polymers can be included at 0.1 to 10% by weight, based on the total weight of the composition.

The laundry detergent composition can optionally further include saturated or unsaturated fatty acids, preferably saturated or unsaturated $C_{12}$-$C_{24}$ fatty acids; deposition aids, for example, polysaccharides, cellulosic polymers, poly diallyl dimethyl ammonium halides (DADMAC), and co-polymers of DADMAC with vinyl pyrrolidone, acrylamides, imidazoles, imidazolinium halides, and mixtures thereof, in random or block configuration, cationic guar gum, cationic starch, cationic polyacylamides or a combination thereof. If present, the fatty acids and/or the deposition aids can each be present at 0.1% to 10% by weight, based on the total weight of the composition.

The detergent composition may optionally include silicone or fatty-acid based suds suppressors; hueing dyes, calcium and magnesium cations, visual signaling ingredients, anti-foam (0.001% to about 4.0% by weight, based on the total weight of the composition), and/or a structurant/thickener (0.01% to 5% by weight, based on the total weight of the composition) selected from the group consisting of diglycerides and triglycerides, ethylene glycol distearate, microcrystalline cellulose, microfiber cellulose, biopolymers, xanthan gum, gellan gum, and mixtures thereof).

Various examples of laundry detergent formulations comprising at least one polysaccharide derivative are disclosed below:

1) A detergent composition formulated as a granulate having a bulk density of at least 600 g/L comprising: linear alkylbenzenesulfonate (calculated as acid) at about 7 to 12% by weight; alcohol ethoxysulfate (e.g., C12-18 alcohol, 1-2 ethylene oxide [EO]) or alkyl sulfate (e.g., C16-18) at about 1 to 4% by weight; alcohol ethoxylate (e.g., C14-15 alcohol) at about 5 to 9% by weight; sodium carbonate at about 14 to 20% by weight; soluble silicate (e.g., $Na_2O$ $2SiO_2$) at about 2 to 6% by weight; zeolite (e.g., $NaAlSiO_4$) at about 15 to 22% by weight; sodium sulfate at about 0 to 6% by weight; sodium citrate/citric acid at about 0 to 15% by weight; sodium perborate at about 11 to 18% by weight; TAED at about 2 to 6% by weight; polysaccharide derivative up to about 2% by weight; other polymers (e.g., maleic/acrylic acid copolymer, PVP, PEG) at about 0 to 3% by weight; optionally an enzyme(s) (calculated as pure enzyme protein) at about 0.0001 to 0.1% by weight; and minor ingredients (e.g., suds suppressors, perfumes, optical brightener, photobleach) at about 0 to 5% by weight.

2) A detergent composition formulated as a granulate having a bulk density of at least 600 g/L comprising: linear alkylbenzenesulfonate (calculated as acid) at about 6 to 11% by weight; alcohol ethoxysulfate (e.g., C12-18 alcohol, 1-2 EO) or alkyl sulfate (e.g., C16-18) at about 1 to 3% by weight; alcohol ethoxylate (e.g., C14-15 alcohol) at about 5 to 9% by weight; sodium carbonate at about 15 to 21% by weight; soluble silicate (e.g., $Na_2O$ $2SiO_2$) at about 1 to 4% by weight; zeolite (e.g., $NaAlSiO_4$) at about 24 to 34% by weight; sodium sulfate at about 4 to 10% by weight; sodium citrate/citric acid at about 0 to 15% by weight; sodium perborate at about 11 to 18% by weight; TAED at about 2 to 6% by weight; polysaccharide derivative up to about 2% by weight; other polymers (e.g., maleic/acrylic acid copolymer, PVP, PEG) at about 1 to 6% by weight; optionally an enzyme(s) (calculated as pure enzyme protein) at about 0.0001 to 0.1% by weight; and minor ingredients (e.g., suds suppressors, perfumes, optical brightener, photobleach) at about 0 to 5% by weight.

3) A detergent composition formulated as a granulate having a bulk density of at least 600 g/L comprising: linear alkylbenzenesulfonate (calculated as acid) at about 5 to 9% by weight; alcohol ethoxysulfate (e.g., C12-18 alcohol, 7 EO) at about 7 to 14% by weight; soap as fatty acid (e.g., C16-22 fatty acid) at about 1 to 3% by weight; sodium carbonate at about 10 to 17% by weight; soluble silicate (e.g., $Na_2O$ $2SiO_2$) at about 3 to 9% by weight; zeolite (e.g., $NaAlSiO_4$) at about 23 to 33% by weight; sodium sulfate at about 0 to 4% by weight; sodium perborate at about 8 to 16% by weight; TAED at about 2 to 8% by weight; phosphonate (e.g., EDTMPA) at about 0 to 1% by weight; polysaccharide derivative up to about 2% by weight; other polymers (e.g., maleic/acrylic acid copolymer, PVP, PEG) at about 0 to 3% by weight; optionally an enzyme(s) (calculated as pure enzyme protein) at about 0.0001 to 0.1% by weight; and minor ingredients (e.g., suds suppressors, perfumes, optical brightener) at about 0 to 5% by weight.

4) A detergent composition formulated as a granulate having a bulk density of at least 600 g/L comprising: linear alkylbenzene sulfonate (calculated as acid) at about 8 to 12% by weight; alcohol ethoxylate (e.g., C12-18 alcohol, 7 EO) at about 10 to 25% by weight; sodium carbonate at about 14 to 22% by weight; soluble silicate (e.g., $Na_2O$ $2SiO_2$) at about 1 to 5% by weight; zeolite (e.g., $NaAlSiO_4$) at about 25 to 35% by weight; sodium sulfate at about 0 to 10% by weight; sodium perborate at about 8 to 16% by weight; TAED at about 2 to 8% by weight; phosphonate (e.g., EDTMPA) at about 0 to 1% by weight; polysaccharide derivative up to about 2% by weight; other polymers (e.g., maleic/acrylic acid copolymer, PVP, PEG) at about 1 to 3% by weight; optionally an enzyme(s) (calculated as pure enzyme protein) at about 0.0001 to 0.1% by weight; and minor ingredients (e.g., suds suppressors, perfumes) at about 0 to 5% by weight.

5) An aqueous liquid detergent composition comprising: linear alkylbenzenesulfonate (calculated as acid) at about 15 to 21% by weight; alcohol ethoxylate (e.g., C12-18 alcohol, 7 EO; or C12-15 alcohol, 5 EO) at about 12 to 18% by weight; soap as fatty acid (e.g., oleic acid) at about 3 to 13% by weight; alkenylsuccinic acid (C12-14) at about 0 to 13% by weight; aminoethanol at about 8 to 18% by weight; citric acid at about 2 to 8% by weight; phosphonate at about 0 to 3% by weight; polysaccharide derivative up to about 2% by weight; other polymers (e.g., PVP, PEG) at about 0 to 3% by weight; borate at about 0 to 2% by weight; ethanol at about 0 to 3% by weight; propylene glycol at about 8 to 14% by weight; optionally an enzyme(s) (calculated as pure enzyme protein) at about 0.0001 to 0.1% by weight; and minor ingredients (e.g., dispersants, suds suppressors, perfume, optical brightener) at about 0 to 5% by weight.

6) An aqueous structured liquid detergent composition comprising: linear alkylbenzenesulfonate (calculated as acid) at about 15 to 21% by weight; alcohol ethoxylate (e.g., C12-18 alcohol, 7 EO; or C12-15 alcohol, 5 EO) at about 3 to 9% by weight; soap as fatty acid (e.g., oleic acid) at about 3 to 10% by weight; zeolite (e.g., $NaAlSiO_4$) at about 14 to 22% by weight; potassium citrate about 9 to 18% by weight; borate at about 0 to 2% by weight; polysaccharide derivative up to about 2% by weight; other polymers (e.g., PVP, PEG) at about 0 to 3% by weight; ethanol at about 0 to 3% by weight; anchoring polymers (e.g., lauryl methacrylate/acrylic acid copolymer, molar ratio 25:1, MW 3800) at about 0 to 3% by weight; glycerol at about 0 to 5% by weight; optionally an enzyme(s) (calculated as pure enzyme protein) at about 0.0001 to 0.1% by weight; and minor ingredients (e.g., dispersants, suds suppressors, perfume, optical brightener) at about 0 to 5% by weight.

7) A detergent composition formulated as a granulate having a bulk density of at least 600 g/L comprising: fatty alcohol sulfate at about 5 to 10% by weight, ethoxylated fatty acid monoethanolamide at about 3 to 9% by weight; soap as fatty acid at about 0 to 3% by weight; sodium carbonate at about 5 to 10% by weight; soluble silicate (e.g., $Na_2O$ $2SiO_2$) at about 1 to 4% by weight; zeolite (e.g., $NaAlSiO_4$) at about 20 to 40% by weight; sodium sulfate at about 2 to 8% by weight; sodium perborate at about 12 to 18% by weight; TAED at about 2 to 7% by weight; polysaccharide derivative up to about 2% by weight; other polymers (e.g., maleic/acrylic acid copolymer, PEG) at about 1 to 5% by weight; optionally an enzyme(s) (calculated as pure enzyme protein) at about 0.0001 to 0.1% by weight; and minor ingredients (e.g., optical brightener, suds suppressors, perfumes) at about 0 to 5% by weight.

8) A detergent composition formulated as a granulate comprising: linear alkylbenzenesulfonate (calculated as acid) at about 8 to 14% by weight; ethoxylated fatty acid monoethanolamide at about 5 to 11% by weight; soap as fatty acid at about 0 to 3% by weight; sodium carbonate at about 4 to 10% by weight; soluble silicate (e.g., $Na_2O$ $2SiO_2$) at about 1 to 4% by weight; zeolite (e.g., $NaAlSiO_4$) at about 30 to 50% by weight; sodium sulfate at about 3 to 11% by weight; sodium citrate at about 5 to 12% by weight; polysaccharide derivative up to about 2% by weight; other polymers (e.g., PVP, maleic/acrylic acid copolymer, PEG) at about 1 to 5% by weight; optionally an enzyme(s) (calculated as pure enzyme protein) at about 0.0001 to 0.1% by weight; and minor ingredients (e.g., suds suppressors, perfumes) at about 0 to 5% by weight.

9) A detergent composition formulated as a granulate comprising: linear alkylbenzenesulfonate (calculated as acid) at about 6 to 12% by weight; nonionic surfactant at about 1 to 4% by weight; soap as fatty acid at about 2 to 6% by weight; sodium carbonate at about 14 to 22% by weight; zeolite (e.g., $NaAlSiO_4$) at about 18 to 32% by weight; sodium sulfate at about 5 to 20% by weight; sodium citrate at about 3 to 8% by weight; sodium perborate at about 4 to 9% by weight; bleach activator (e.g., NOBS or TAED) at about 1 to 5% by weight; polysaccharide derivative up to about 2% by weight; other polymers (e.g., polycarboxylate or PEG) at about 1 to 5% by weight; optionally an enzyme(s) (calculated as pure enzyme protein) at about 0.0001 to 0.1% by weight; and minor ingredients (e.g., optical brightener, perfume) at about 0 to 5% by weight.

10) An aqueous liquid detergent composition comprising: linear alkylbenzenesulfonate (calculated as acid) at about 15 to 23% by weight; alcohol ethoxysulfate (e.g., $C_{12-15}$ alcohol, 2-3 EO) at about 8 to 15% by weight; alcohol ethoxylate (e.g., $C_{12-15}$ alcohol, 7 EO; or C12-15 alcohol, 5 EO) at about 3 to 9% by weight; soap as fatty acid (e.g., lauric acid) at about 0 to 3% by weight; aminoethanol at about 1 to 5% by weight; sodium citrate at about 5 to 10% by weight; hydrotrope (e.g., sodium cumene sulfonate) at about 2 to 6% by weight; borate at about 0 to 2% by weight; polysaccharide derivative up to about 1% by weight; ethanol at about 1 to 3% by weight; propylene glycol at about 2 to 5% by weight; optionally an enzyme(s) (calculated as pure enzyme protein) at about 0.0001 to 0.1% by weight; and minor ingredients (e.g., dispersants, perfume, optical brighteners) at about 0 to 5% by weight.

11) An aqueous liquid detergent composition comprising: linear alkylbenzenesulfonate (calculated as acid) at about 20 to 32% by weight; alcohol ethoxylate (e.g., C12-15 alcohol, 7 EO; or C12-15 alcohol, 5 EO) at about 6 to 12% by weight; aminoethanol at about 2 to 6% by weight; citric acid at about 8 to 14% by weight; borate at about 1 to 3% by weight; polysaccharide derivative up to about 2% by weight; ethanol at about 1 to 3% by weight; propylene glycol at about 2 to 5% by weight; other polymers (e.g., maleic/acrylic acid copolymer, anchoring polymer such as lauryl methacrylate/acrylic acid copolymer) at about 0 to 3% by weight; glycerol at about 3 to 8% by weight; optionally an enzyme(s) (calculated as pure enzyme protein) at about 0.0001 to 0.1% by weight; and minor ingredients (e.g., hydrotropes, dispersants, perfume, optical brighteners) at about 0 to 5% by weight.

12) A detergent composition formulated as a granulate having a bulk density of at least 600 g/L comprising: anionic surfactant (e.g., linear alkylbenzenesulfonate, alkyl sulfate, alpha-olefinsulfonate, alpha-sulfo fatty acid methyl esters, alkanesulfonates, soap) at about 25 to 40% by weight; nonionic surfactant (e.g., alcohol ethoxylate) at about 1 to 10% by weight; sodium carbonate at about 8 to 25% by weight; soluble silicate (e.g., $Na_2O$ $2SiO_2$) at about 5 to 15% by weight; sodium sulfate at about 0 to 5% by weight; zeolite ($NaAlSiO_4$) at about 15 to 28% by weight; sodium perborate at about 0 to 20% by weight; bleach activator (e.g., TAED or NOBS) at about 0 to 5% by weight; polysaccharide derivative up to about 2% by weight; optionally an enzyme (s) (calculated as pure enzyme protein) at about 0.0001 to 0.1% by weight; and minor ingredients (e.g., perfume, optical brighteners) at about 0 to 3% by weight.

13) Detergent compositions as described in (1)-(12) above, but in which all or part of the linear alkylbenzenesulfonate is replaced by C12-C18 alkyl sulfate.

14) A detergent composition formulated as a granulate having a bulk density of at least 600 g/L comprising: C12-C18 alkyl sulfate at about 9 to 15% by weight; alcohol ethoxylate at about 3 to 6% by weight; polyhydroxy alkyl fatty acid amide at about 1 to 5% by weight; zeolite (e.g., $NaAlSiO_4$) at about 10 to 20% by weight; layered disilicate (e.g., SK56 from Hoechst) at about 10 to 20% by weight; sodium carbonate at about 3 to 12% by weight; soluble silicate (e.g., $Na_2O$ $2SiO_2$) at 0 to 6% by weight; sodium citrate at about 4 to 8% by weight; sodium percarbonate at about 13 to 22% by weight; TAED at about 3 to 8% by weight; polysaccharide derivative up to about 2% by weight; other polymers (e.g., polycarboxylates and PVP) at about 0 to 5% by weight; optionally an enzyme(s) (calculated as pure enzyme protein) at about 0.0001 to 0.1% by weight; and minor ingredients (e.g., optical brightener, photobleach, perfume, suds suppressors) at about 0 to 5% by weight.

15) A detergent composition formulated as a granulate having a bulk density of at least 600 g/L comprising: C12-C18 alkyl sulfate at about 4 to 8% by weight; alcohol ethoxylate at about 11 to 15% by weight; soap at about 1 to 4% by weight; zeolite MAP or zeolite A at about 35 to 45% by weight; sodium carbonate at about 2 to 8% by weight; soluble silicate (e.g., $Na_2O$ $2SiO_2$) at 0 to 4% by weight; sodium percarbonate at about 13 to 22% by weight; TAED at about 1 to 8% by weight; polysaccharide derivative up to about 3% by weight; other polymers (e.g., polycarboxylates and PVP) at about 0 to 3% by weight; optionally an enzyme(s) (calculated as pure enzyme protein) at about 0.0001 to 0.1% by weight; and minor ingredients (e.g., optical brightener, phosphonate, perfume) at about 0 to 3% by weight.

16) Detergent formulations as described in (1) to (15) above, but that contain a stabilized or encapsulated peracid, either as an additional component or as a substitute for an already specified bleach system(s).

17) Detergent compositions as described in (1), (3), (7), (9) and (12) above, but in which perborate is replaced by percarbonate. 18) Detergent compositions as described in (1), (3), (7), (9), (12), (14) and (15) above, but that additionally contain a manganese catalyst. A manganese catalyst, for example, is one of the compounds described by Hage et al. (1994, *Nature* 369:637-639), which is incorporated herein by reference.

19) Detergent compositions formulated as a non-aqueous detergent liquid comprising a liquid non-ionic surfactant, for example, a linear alkoxylated primary alcohol, a builder system (e.g., phosphate), polysaccharide derivative, optionally an enzyme(s), and alkali. The detergent may also comprise an anionic surfactant and/or bleach system.

20) An aqueous liquid detergent composition comprising: non-petroleum-derived alcohol ethoxysulfate (e.g., C12 alcohol, 1 EO) sodium sulfate at about 30 to 45% by weight; non-petroleum-derived alcohol ethoxylate (e.g., C12-14 alcohol, 9 EO) at about 3 to 10% by weight; soap as fatty acid (e.g., C12-18) at about 1 to 5% by weight; propylene glycol at about 5-12% by weight; C12-14 alkyl amineoxide at about 4 to 8% by weight; citric acid at about 2 to 8% by weight; polysaccharide derivative up to about 4% by weight; other polymers (e.g., PVP, PEG) at about 0 to 3% by weight; borate at about 0 to 4% by weight; ethanol at about 0 to 3% by weight; optionally an enzyme(s) (calculated as pure enzyme protein) at about 0.0001 to 0.3% by weight; and minor ingredients (e.g., dispersants, suds suppressors, perfume, optical brightener, stabilizers) at about 0 to 5% by weight and the balance being water.

21) A water-soluble unit dose detergent composition comprising: alcohol ethoxysulfate (e.g., C12-15 alcohol, 2-3 EO) sodium sulfate at about 10 to 25% by weight; linear alkylbenzenesulfonate (calculated as acid) at about 15 to 25% by weight; alcohol ethoxylate (e.g., C12-14 alcohol, 9 EO) at about 0.5 to 10% by weight; alcohol ethoxylate (e.g., C12-15 alcohol, 7 EO) at about 0.5 to 10% by weight; soap as fatty acid (e.g., C12-18) at about 1 to 8% by weight; propylene glycol at about 6 to 15% by weight; citric acid at about 0.5 to 8% by weight; polysaccharide derivative up to about 4% by weight; monoethanolamine at about 5 to 10% by weight, other polymers (e.g., PVP, PEG, PVOH) at about 0 to 3% by weight; dipropyleneglycol at about 2 to 6%, glycerine at about 2 to 5% by weight; optionally an enzyme (s) (calculated as pure enzyme protein) at about 0.0001 to 0.3% by weight; and minor ingredients (e.g., dispersants, suds suppressors, perfume, optical brightener, stabilizers) at about 0 to 5% by weight and the balance being water.

EXAMPLES

Laundry care and dish care compositions are typically suitable for: (a) the care of finished textiles, cleaning of finished textiles, sanitization of finished textiles, disinfection of finished textiles, detergents, stain removers, softeners, fabric enhancers, stain removal or finished textiles treatments, pre and post wash treatments, washing machine cleaning and maintenance, with finished textiles intended to include garments and items made of cloth; (b) the care of dishes, glasses, crockery, cooking pots, pans, utensils, cutlery and the like in automatic, in-machine washing, including detergents, preparatory post treatment and machine cleaning and maintenance products for both the dishwasher, the utilized water and its contents; or (c) manual hand dish washing detergents.

The following example formulations are suitable for the present invention:

The following are illustrative examples of cleaning compositions according to the present disclosure and are not intended to be limiting.

Examples 1-7: Heavy Duty Liquid Laundry Detergent Compositions

| Ingredients | 1 | 2 | 3 | 4<br>% weight | 5 | 6 | 7 |
|---|---|---|---|---|---|---|---|
| $AE_{1.8}S$ | 6.77 | 5.16 | 1.36 | 1.30 | — | — | — |
| $AE_3S$ | — | — | — | — | 0.45 | — | — |
| LAS | 0.86 | 2.06 | 2.72 | 0.68 | 0.95 | 1.56 | 3.55 |
| HSAS | 1.85 | 2.63 | 1.02 | — | — | — | — |
| AE9 | 6.32 | 9.85 | 10.20 | 7.92 | | | |
| AE8 | | | | | | | 35.45 |
| AE7 | | | | | 8.40 | 12.44 | |
| $C_{12-14}$ dimethyl Amine Oxide | 0.30 | 0.73 | 0.23 | 0.37 | — | — | — |
| $C_{12-18}$ Fatty Acid | 0.80 | 1.90 | 0.60 | 0.99 | 1.20 | — | 15.00 |
| Citric Acid | 2.50 | 3.96 | 1.88 | 1.98 | 0.90 | 2.50 | 0.60 |
| Optical Brightener 1 | 1.00 | 0.80 | 0.10 | 0.30 | 0.05 | 0.50 | 0.001 |
| Optical Brightener 3 | 0.001 | 0.05 | 0.01 | 0.20 | 0.50 | — | 1.00 |
| Sodium formate | 1.60 | 0.09 | 1.20 | 0.04 | 1.60 | 1.20 | 0.20 |
| DTI | 0.32 | 0.05 | — | 0.60 | — | 0.60 | 0.01 |
| Sodium hydroxide | 2.30 | 3.80 | 1.70 | 1.90 | 1.70 | 2.50 | 2.30 |
| Monoethanolamine | 1.40 | 1.49 | 1.00 | 0.70 | — | — | — |
| Diethylene glycol | 5.50 | — | 4.10 | — | — | — | — |
| Chelant 1 | 0.15 | 0.15 | 0.11 | 0.07 | 0.50 | 0.11 | 0.80 |
| 4-formyl-phenylboronic acid | — | — | — | — | 0.05 | 0.02 | 0.01 |
| Sodium tetraborate | 1.43 | 1.50 | 1.10 | 0.75 | — | 1.07 | — |
| Ethanol | 1.54 | 1.77 | 1.15 | 0.89 | — | 3.00 | 7.00 |
| Polymer 1 | 0.10 | — | — | — | — | — | 2.00 |
| Polymer 2 | 0.30 | 0.33 | 0.23 | 0.17 | — | — | — |
| Polymer 3 | — | — | — | — | — | — | 0.80 |
| Polymer 4 | 0.80 | 0.81 | 0.60 | 0.40 | 1.00 | 1.00 | — |
| Polymer 5 (polyglucans) | 0.50 | 1.00 | 2.00 | 2.50 | 3.00 | 2.50 | 1.50 |
| 1,2-Propanediol | — | 6.60 | — | 3.30 | 0.50 | 2.00 | 8.00 |
| Structurant | 0.10 | — | — | — | — | — | 0.10 |
| Perfume | 1.60 | 1.10 | 1.00 | 0.80 | 0.90 | 1.50 | 1.60 |
| Perfume encapsulate | 0.10 | 0.05 | 0.01 | 0.02 | 0.10 | 0.05 | 0.10 |
| Protease | 0.80 | 0.60 | 0.70 | 0.90 | 0.70 | 0.60 | 1.50 |
| Mannanase | 0.07 | 0.05 | 0.045 | 0.06 | 0.04 | 0.045 | 0.10 |
| Amylase 1 | 0.30 | — | 0.30 | 0.10 | — | 0.40 | 0.10 |
| Amylase 2 | — | 0.20 | 0.10 | 0.15 | 0.07 | — | 0.10 |
| Xyloglucanase | 0.20 | 0.10 | — | — | 0.05 | 0.05 | 0.20 |
| Lipase | 0.40 | 0.20 | 0.30 | 0.10 | 0.20 | — | — |
| Polishing enzyme | — | 0.04 | — | — | — | 0.004 | — |
| Nuclease | 0.05 | — | — | — | — | — | 0.003 |
| Dispersin B | — | — | — | 0.05 | 0.03 | 0.001 | 0.001 |
| Liquitint ® V200 | 0.01 | — | — | — | — | — | 0.005 |
| Leuco colorant | 0.05 | 0.035 | 0.01 | 0.02 | 0.004 | 0.002 | 0.004 |
| Dye control agent | — | 0.3 | — | 0.03 | — | 0.3 | 0.3 |
| Water, dyes & minors | | | | Balance | | | |
| pH | | | | 8.2 | | | |

Based on total cleaning and/or treatment composition weight. Enzyme levels are reported as raw material.

| | |
|---|---|
| AE1.8S | is $C_{12-15}$ alkyl ethoxy (1.8) sulfate |
| AE3S | is $C_{12-15}$ alkyl ethoxy (3) sulfate |
| AE7 | is $C_{12-13}$ alcohol ethoxylate, with an average degree of ethoxylation of 7 |
| AE8 | is $C_{12-13}$ alcohol ethoxylate, with an average degree of ethoxylation of 8 |
| AE9 | is $C_{12-13}$ alcohol ethoxylate, with an average degree of ethoxylation of 9 |
| Amylase 1 | is Stainzyme ®, 15 mg active/g, supplied by Novozymes |
| Amylase 2 | is Natalase ®, 29 mg active/g, supplied by Novozymes |
| Xyloglucanase | is Whitezyme ®, 20 mg active/g, supplied by Novozymes |
| Chelant 1 | is diethylene triamine pentaacetic acid |
| Chelant 2 | is 1-hydroxyethane 1,1-diphosphonic acid |
| Dispersin B | is a glycoside hydrolase, reported as 1000 mg active/g |
| DTI | is either poly(4-vinylpyridine-1-oxide) (such as Chromabond S-403E ®), or poly(1-vinylpyrrolidone-co-1-vinylimidazole) (such as Sokalan HP56 ®). |

-continued

| | |
|---|---|
| Dye control agent | Dye control agent in accordance with the invention, for example Suparex ® O.IN (M1), Nylofixan ® P (M2), Nylofixan ® PM (M3), or Nylofixan ® HF (M4) |
| HSAS | is mid-branched alkyl sulfate as disclosed in U.S. Pat. No. 6,020,303 and U.S. Pat. No. 6,060,443 |
| LAS | is linear alkylbenzenesulfonate having an average aliphatic carbon chain length $C_9$-$C_{15}$ (HLAS is acid form). |
| Leuco colorant | Any suitable leuco colorant or mixtures thereof according to the instant invention. |
| Lipase | is Lipex ®, 18 mg active/g, supplied by Novozymes |
| Liquitint ® V200 | is a thiophene azo dye provided by Milliken |
| Mannanase | is Mannaway ®, 25 mg active/g, supplied by Novozymes |
| Nuclease | is a Phosphodiesterase SEQ ID NO 1, reported as 1000 mg active/g |
| Optical Brightener 1 | is disodium 4,4'-bis{[4-anilino-6-morpholino-s-triazin-2-yl]-amino}-2,2'-stilbenedisulfonate |
| Optical Brightener 3 | is Optiblanc SPL10 ® from 3V Sigma |
| Perfume encapsulate | is a core-shell melamine formaldehyde perfume microcapsules. |
| Polishing enzyme | is Para-nitrobenzyl esterase, reported as 1000 mg active/g |
| Polymer 1 | is $bis((C_2H_5O)(C_2H_4O)n)(CH_3)—N^+—C_xH_{2x}—N^+—(CH_3)—bis((C_2H_5O)(C_2H_4O)n)$, wherein n = 20-30, x = 3 to 8 or sulphated or sulfonated variants thereof |
| Polymer 2 | is ethoxylated ($EO_{15}$) tetraethylene pentamine |
| Polymer 3 | is ethoxylated polyethylenimine |
| Polymer 4 | is ethoxylated hexamethylene diamine |
| Polymer 5 | is modified polyglucans of this invention |
| Protease | is Purafect Prime ®, 40.6 mg active/g, supplied by DuPont |
| Structurant | is Hydrogenated Castor Oil |

The following is a suitable water-soluble unit dose formulation. The composition can be part of a single chamber water soluble unit dose article or can be split over multiple compartments resulting in below "averaged across compartments" full article composition.

| Ingredients | Composition 1 (wt %) |
|---|---|
| Fatty alcohol ethoxylate non-ionic surfactant, $C_{12-14}$ average degree of ethoxylation of 7 | 3.8 |
| Lutensol XL 100 | 0.5 |
| Linear $C_{11-14}$ alkylbenzene sulphonate | 24.6 |
| AE3S Ethoxylated alkyl sulphate with an average degree of ethoxylation of 3 | 12.5 |
| Citric acid | 0.7 |
| Palm Kernel Fatty acid | 5.3 |
| Nuclease enzyme (wt % active protein) | 0.01 |
| Protease enzyme (wt % active protein) | 0.07 |
| Amylase enzyme (wt % active protein) | 0.005 |
| Xyloglucanese enzyme (wt % active protein) | 0.005 |
| Mannanase enzyme (wt % active protein) | 0.003 |
| Ethoxylated polyethyleneimine | 1.6 |
| Amphiphilic graft copolymer | 2.6 |
| Zwitterionic polyamine | 1.8 |
| Polyglucan of the present invention | 5.0 |
| Anionic polyester terephthalate | 0.6 |

-continued

| Ingredients | Composition 1 (wt %) |
|---|---|
| HEDP | 2.2 |
| Brightener 49 | 0.4 |
| Silicone anti-foam | 0.3 |
| Hueing dye | 0.05 |
| 1,2 PropaneDiol | 12.3 |
| Glycerine | 4.7 |
| DPG (DiPropyleneGlycol) | 1.7 |
| TPG (TriPropyleneGlycol) | 0.1 |
| Sorbitol | 0.1 |
| Monoethanolamine | 10.2 |
| K2SO3 | 0.4 |
| MgCl2 | 0.3 |
| water | 10.8 |
| Hydrogenated castor oil | 0.1 |
| Perfume | 2.1 |
| Aesthetic dye & Minors | Balance to 100 |
| pH (10% product concentration in demineralized water at 20° C.) | 7.4 |

Solid Free-Flowing Particulate Laundry Detergent Composition Examples

| Ingredient | Amount (in wt %) |
|---|---|
| Anionic detersive surfactant (such as alkyl benzene sulphonate, alkyl ethoxylated sulphate and mixtures thereof) | from 8 wt % to 15 wt % |
| Non-ionic detersive surfactant (such as alkyl ethoxylated alcohol) | from 0.1 wt % to 4 wt % |
| Cationic detersive surfactant (such as quaternary ammonium compounds) | from 0 wt % to 4 wt % |
| Other detersive surfactant (such as zwiterionic detersive surfactants, amphoteric surfactants and mixtures thereof) | from 0 wt % to 4 wt % |
| Carboxylate polymer (such as co-polymers of maleic acid and acrylic acid and/or carboxylate polymers comprising ether moieties and sulfonate moieties) | from 0.1 wt % to 4 wt % |
| Polyethylene glycol polymer (such as a polyethylene glycol polymer comprising polyvinyl acetate side chains) | from 0 wt % to 4 wt % |
| Polyester soil release polymer (such as Repel-o-tex and/or Texcare polymers) | from 0 wt % to 2 wt % |

-continued

| Ingredient | Amount (in wt %) |
|---|---|
| Cellulosic polymer (such as carboxymethyl cellulose, methyl cellulose and combinations thereof) | from 0.5 wt % to 2 wt % |
| Polyglucan of the present invention | From 0.1 wt % to 8 wt % |
| Other polymer (such as care polymers) | from 0 wt % to 4 wt % |
| Zeolite builder and phosphate builder (such as zeolite 4A and/or sodium tripolyphosphate) | from 0 wt % to 4 wt % |
| Other co-builder (such as sodium citrate and/or citric acid) | from 0 wt % to 3 wt % |
| Carbonate salt (such as sodium carbonate and/or sodium bicarbonate) | from 0 wt % to 20 wt % |
| Silicate salt (such as sodium silicate) | from 0 wt % to 10 wt % |
| Filler (such as sodium sulphate and/or bio-fillers) | from 10 wt % to 70 wt % |
| Source of hydrogen peroxide (such as sodium percarbonate) | from 0 wt % to 20 wt % |
| Bleach activator (such as tetraacetylethylene diamine (TAED) and/or nonanoyloxybenzenesulphonate (NOBS)) | from 0 wt % to 8 wt % |
| Bleach catalyst (such as oxaziridinium-based bleach catalyst and/or transition metal bleach catalyst) | from 0 wt % to 0.1 wt % |
| Other bleach (such as reducing bleach and/or pre-formed peracid) | from 0 wt % to 10 wt % |
| Photobleach (such as zinc and/or aluminium sulphonated phthalocyanine) | from 0 wt % to 0.1 wt % |
| Chelant (such as ethylenediamine-N'N'-disuccinic acid (EDDS) and/or hydroxyethane diphosphonic acid (HEDP)) | from 0.2 wt % to 1 wt % |
| Hueing agent (such as direct violet 9, 66, 99, acid red 50, solvent violet 13 and any combination thereof) | from 0 wt % to 1 wt % |
| Brightener (C.I. fluorescent brightener 260 or C.I. fluorescent brightener 351) | from 0.1 wt % to 0.4 wt % |
| Protease (such as Savinase, Savinase Ultra, Purafect, FN3, FN4 and any combination thereof) | from 0.1 wt % to 0.4 wt % |
| Amylase (such as Termamyl, Termamyl ultra, Natalase, Optisize, Stainzyme, Stainzyme Plus and any combination thereof) | from 0 wt % to 0.2 wt % |
| Cellulase (such as Carezyme and/or Celluclean) | from 0 wt % to 0.2 wt % |
| Lipase (such as Lipex, Lipolex, Lipoclean and any combination thereof) | from 0 wt % to 1 wt % |
| Other enzyme (such as xyloglucanase, cutinase, pectate lyase, mannanase, bleaching enzyme) | from 0 wt % to 2 wt % |
| Fabric softener (such as montmorillonite clay and/or polydimethylsiloxane (PDMS)) | from 0 wt % to 15 wt % |
| Flocculant (such as polyethylene oxide) | from 0 wt % to 1 wt % |
| Suds suppressor (such as silicone and/or fatty acid) | from 0 wt % to 4 wt % |
| Perfume (such as perfume microcapsule, spray-on perfume, starch encapsulated perfume accords, perfume loaded zeolite, and any combination thereof) | from 0.1 wt % to 1 wt % |
| Aesthetics (such as coloured soap rings and/or coloured speckles/noodles) | from 0 wt % to 1 wt % |
| Miscellaneous | balance to 100 wt % |

Examples

Unless otherwise stated, all ingredients are available from Sigma-Aldrich, St. Louis, Missouri and were used as received.

As used herein, "Comp. Ex." Means Comparative Example; "Ex." means Example; "std dev" means standard deviation; "g" means gram(s); "mL" means milliliter(s); "uL" means microliter(s); "wt" means weight; "L" means liter(s); "min" means minute(s); "kDa" means kilodaltons; "PES" means polyethersulfone.

Method for Determining Anomeric Linkages by NMR Spectroscopy

Glycosidic linkages in water soluble oligosaccharides and polysaccharide products synthesized by a glucosyltransferase GTF8117 and alpha-1,2 branching enzyme were determined by $^1$H NMR (Nuclear Magnetic Resonance Spectroscopy). Dry oligosaccharide/polysaccharide polymer (6 mg to 8 mg) was dissolved in a solution of 0.7 mL of 1 mM DSS (4,4-dimethyl-4-silapentane-1-sulfonic acid; NMR reference standard) in $D_2O$. The sample was stirred at ambient temperature overnight. 525 μL of the clear homogeneous solution was transferred to a 5 mm NMR tube. 2D $^1$H,$^{13}$C homo/hetero-nuclear suite of NMR experiments were used to identify AGU (anhydroglucose unit) linkages. The data were collected at 20° C. and processed on a Bruker Avance III NMR spectrometer, operating at either 500 MHz or 600 MHz. The systems are equipped with a proton optimized, helium cooled cryoprobe. The 1D $^1$H NMR spectrum was used to quantify glycosidic linkage distribution and finds the polysaccharide backbone as primarily alpha-1,6. The results reflect the ratio of the integrated intensity of a NMR resonance representing an individual linkage type divided by the integrated intensity of the sum of all peaks which represent glucose linkages, multiplied by 100.

Method for Evaluating Whiteness Performance of Polymers

Whiteness maintenance, also referred to as whiteness preservation, is the ability of a detergent to keep white items from whiteness loss when they are washed in the presence of soils. White garments can become dirty/dingy looking over time when soils are removed from dirty clothes and suspended in the wash water, then these soils can re-deposit onto clothing, making the clothing less white each time they are washed. The whiteness benefit of polymers as presently disclosed is evaluated using automatic Miniwasher with 5 pots. SBL2004 test soil strips supplied by WFKTestgewebe GmbH are used to simulate consumer soil levels (mix of body soil, food, dirt, grass etc.). On average, every 1 SBL2004 strip is loaded with 8 g soil. White Fabric swatches of Table 2 below purchased from WFK are used as whiteness tracers. Before wash test, L, a, b values of all whiteness tracers are measured using Konica Minolta CM-3610D spectrophotometer.

TABLE 2

| Code | % Fiber Content | Fiber Construction | Fabric Density (g/m) | Whiteness Index (WI) A* | Whiteness Index (WI) D65** | Size |
|---|---|---|---|---|---|---|
| Cotton Terry | 100 | Woven | ~540 | ~93 | ~163 | 8" × 8" (20 × 20 cm) |
| Cotton Knit | 100 | Weft Knit | ~220 | ~96 | ~165 | 8" × 8" (20 × 20 cm) |
| Polyester/Cotton | 65/35 | Plain Woven | ~125 | ~98 | ~156 | 8" × 8" (20 × 20 cm) |
| Polyester | 100 | Weft Knit | ~200 | ~95 | ~156 | 8" × 8" (20 × 20 cm) |
| Cotton/Spandex | 98/2 | Woven Twill | ~180 | ~86 | ~158 | 8" × 8" (20 × 20 cm) |

Notes:
*WI(A) - illuminant A (indoor lighting)
** WI(D65) - illuminant D65 (outdoor lighting)

Three cycles of wash are needed to complete the test:

Cycle 1: desired amount of base detergent are fully dissolved by mixing with 7.57 L water (at defined hardness) in each Miniwasher tube. 3.5 SBL2004 strips (~28 g of soil) and 3 whiteness tracers (internal replicate) of each fabric type are the washed and rinsed in the Miniwasher under defined conditions, then dried.

Cycle 2: The above whiteness tracers are washed again with new set of SBL2004 sheet, and dried. All other conditions remain same as cycle 1.

Cycle 3: The above whiteness tracers are washed again with new set of SBL2004 sheet, and dried. All other conditions remain same as cycle 1.

After Cycle 3, all whiteness tracers are dried and then measured again using Konica Minolta CM-3610D spectrophotometer. The changes in Whiteness Index (ΔWI(CIE)) are calculated based on L, a, b measure before and after wash.

$$\Delta WI(CIE)=WI(CIE)(\text{after wash})-WI(CIE)(\text{before wash}).$$

Miniwasher have 5 pots, 5 products can be tested in one test. In a typically polymer whiteness performance test, one reference product containing comparative polymer, or no polymer are tested together with 4 products containing inventive polymers, "ΔWI versus reference" is reported.

$$\Delta WI(CIE)\text{ versus reference}=\Delta WI(CIE)(\text{product})-\Delta WI(CIE)(\text{reference})$$

Method for Evaluating Cleaning Benefit of Polymers

Cleaning benefit of polymers are evaluated using tergotometer. Some examples test stains suitable for this test are:

Standard Grass ex CFT
Standard Clay ex CFT
ASTM Dust Sebum ex CFT
Highly Discriminating Sebum on polycotton ex CFT
Burnt Bacon on Knitted cotton (prepared using burnt bacon ex Equest)
Dyed Bacon on Knitted Cotton (prepared using dyed bacon ex Equest)

The fabrics were analyzed using commercially available DigiEye software for L, a, b values.

Inventive polymer stock solution in de-ionized water is prepared to deliver the desired dosage via 5 ml aliquot. To make 1 L of test solution, 5 ml aliquot of polymer stock solution, and desired amount of base detergent are fully dissolved by mixing with water (at defined hardness) in tergotometer pot. The wash temperature is 20° C.

The fabrics to be washed in each tergotometer pot include 2 pieces of each test stain (2 internal replicates), approximately 3 g of WfK SBL 2004 soil sheets, and additional knitted cotton ballast to make the total fabric weight up to 60 g.

Once all the fabrics are added into tergotometer pot containing wash solution, the wash solution is agitated for 12 minutes. The wash solutions are then drained, and the fabrics are subject to 5 minute rinse steps twice before being drained and spun dry. The washed stains are dried in an airflow cabinet, then analyzed using commercially available DigiEye software for L, a, b values.

This procedure was repeated further three times to give a total of 4 external replicates.

Stain Removal Index (SRI) are calculated from the L, a, b values using the formula shown below. The higher the SRI, the better the stain removal.

$$SRI=100*((\Delta E_b-\Delta E_a)/\Delta E_b))$$

$$\Delta E_b=\sqrt{((L_c-L_b)^2+(a_c-a_b)^2+(b_c-b_b)^2)}$$

$$\Delta E_a=\sqrt{((L_c-L_a)^2+(a_c-a_a)^2+(b_c-b_a)^2)}$$

Subscript 'b' denotes data for the stain before washing
Subscript 'a' denotes data for the stain after washing
Subscript 'c' denotes data for the unstained fabric Inventive Polymer 1:

Modification of Poly alpha-1,3 Glucan with Benzoyl Chloride in Dimethylacetamide To an agitated and jacketed 1 liter resin kettle was added 550 g of dimethylacetamide, 37 grams of the poly alpha-1,3 glucan polymer (backbone MW: 120K) and 26 grams of calcium chloride dihydrate. After holding the contents at 70° C. over a period of 2.25 hours, the poly alpha-1,3 glucan and calcium chloride dihydrate went into solution. The contents were heated to 78° C. and then 21 ml of benzoyl chloride were fed over a 1.5 min period. The solution was held between 8° and 84° C. for 2 hours. Heat to the reactor was then turned off and vacuum was pulled to promote evaporative cooling of the reactor contents. After removing 65 g of DMAc overhead, the reactor pressure was raised back to atmospheric pressure and 443 g of the reactor liquor was poured into acetone for precipitation of the solids and then the solids were slurried twice with 1 liter of methanol to yield, after filtration and drying overnight. NMR analysis of the product indicated degree of substitution of benzoate content of 0.20 and an acetate content of 0.08.

Other inventive polymer examples 2-8 are summarized in table below:

Inventive Polymer 2-8

| Inventive Polymer | Modification | DS | Backbone MW (K) |
|---|---|---|---|
| 1 | Benzoyl/acetyl ester | 0.20/0.08 | 120 |
| 2 | benzoyl/acetyl ester | 0.40/0.04 | 120 |
| 3 | benzoyl/acetyl ester | 0.14/0.14 | 120 |
| 4 | benzoyl/acetyl ester | 0.30/0.23 | 120 |
| 5 | benzoyl ester | 0.83 | 120 |
| 6 | benzoyl/acetyl ester | 0.32/0.10 | 120 |
| 9 | benzoyl ester | 0.20 | 120 |
| 10 | lauryl ester | 0.21 | 120 |
| 11 | lauryl ester | 0.12 | 120 |
| 12 | lauryl ester | 0.06 | 120 |

Polymer Performance in Liquid Detergent

Polymer Cleaning Performance Detergent

Liquid detergent I and II below are prepared by traditional means know to those of ordinary skill in the art by mixing the listed ingredient. Comparative Formulation I is used as reference to test the benefit from the inventive polymer.

| Detergent ingredients | I (Comparative) | II (Inventive) |
|---|---|---|
| LAS (%) | 17.6 | 17.6 |
| AES (%) | 4.4 | 4.4 |
| NI (%) | 0.9 | 0.9 |
| Amine Oxide (%) | 0.8 | 0.8 |
| DTPA (%) | 0.6 | 0.6 |
| Monoethanolamine (MEA) (%) | 2.3 | 2.3 |
| 1,2-Propanediol (%) | 6.7 | 6.7 |
| Sodium cumene sulfonate (%) | 0.6 | 0.6 |
| Citric Acid (%) | 2.6 | 2.6 |
| Fatty Acid (%) | 1.1 | 1.1 |
| Ethanol (%) | 2.5 | 2.5 |
| Brightener (%) | 0.2 | 0.2 |
| Inventive polymer 1 | 0 | 2.0 |
| Enzyme (Protease, Mannanase, Amylase) (%) | 0.068 | 0.068 |
| Preservative (%) | 0.2 | 0.2 |
| Structurant (%) | 0.1 | 0.1 |
| Water | balance | balance |

The cleaning benefit of Inventive polymer 1 is evaluated according to method for evaluating cleaning benefit of polymers by comparing the cleaning performance of formula I and II. Inventive polymer 1 deliver significant cleaning benefit, especially for sebum and greasy stains.

| Stains | SRI (I) | SRI (II) | Delta SRI |
|---|---|---|---|
| ASTM Dust Sebum PC-S-94 | 29.3 | 36.2 | +6.9s |
| Highly Discriminating Sebum PC-S-132 | 26.3 | 30.9 | +4.6s |
| Burnt Butter | 60.3 | 66.9 | +6.6s |

Note:
product concentration of the test: 2260 ppm; water hardness: 22 gpg
s: data are statistically significant.

Polymer Whiteness Performance Detergent

Liquid detergent III and IV below are prepared by traditional means know to those of ordinary skill in the art by mixing the listed ingredient. Comparative Formulation III is used as reference to test the benefit from the inventive polymer.

| Detergent ingredients | III (Comparative) | IV (Inventive) |
|---|---|---|
| Sodium Lauryl Sulfate (%) | 11.09 | 11.09 |
| Non-ionic surfactant (%) | 7.58 | 7.58 |
| Amine Oxide (%) | 1.88 | 1.88 |
| Fatty Acid (%) | 2.95 | 2.95 |
| DTPA (%) | 0.23 | 0.23 |
| Ethanol (%) | 1.63 | 1.63 |
| NaOH (%) | 1.86 | 1.86 |
| 1,2-Propanediol (%) | 10.89 | 10.89 |
| Sodium tetraborate (%) | 0.96 | 0.96 |
| Citric acid (%) | 2.45 | 2.45 |
| Enzyme system (Protease, Amylase, Mannanase) (%) | 0.079 | 0.079 |
| Preservative (%) | 0.001 | 0.001 |
| Perfume (%) | 0.45 | 0.45 |
| Inventive polymer 1 (%) | 0 | 0.92 |
| Water (%) | balance | balance |
| ΔWI(CIE) versus reference on PE (100% polyester knit) | Reference | 47.44 |

The whiteness maintenance inventive polymer 1 is evaluated according to method for evaluating whiteness performance of polymers by comparing the cleaning performance of formula III and IV. Inventive polymer 1 deliver significant whiteness benefit, especially on synthetic (polyester) fabric.

Liquid detergent V and VI below are prepared by traditional means know to those of ordinary skill in the art by mixing the listed ingredient. Comparative Formulation V is used as reference to test the benefit from the inventive polymer.

| Detergent ingredients | V (Comparative) | VI (Inventive) |
|---|---|---|
| AES (%) | 5.78 | 5.78 |
| LAS (%) | 10.60 | 10.60 |
| NI C45EO7 (%) | 6.57 | 6.57 |
| NI 24EO9 (%) | 0.10 | 0.10 |
| DTPA (%) | 0.46 | 0.46 |
| Monoethanolamine (MEA) (%) | 2.52 | 2.52 |
| Sodium cumene sulfonate (%) | 1.21 | 1.21 |
| NaOH (%) | 0.43 | 0.43 |
| Sodium Tetraborate (%) | 1.21 | 1.21 |
| Citric acid (%) | 1.60 | 1.60 |
| Calcium formate (%) | 0.12 | 0.12 |
| Ethanol (%) | 1.61 | 1.61 |
| Enzyme (Protease, Amylase, Mannanase) (%) | 0.08 | 0.08 |
| Brightener (%) | 0.16 | 0.16 |
| Dye (%) | 0.04 | 0.04 |
| Perfume (%) | 0.57 | 0.57 |
| Antifoam (%) | 0.20 | 0.20 |
| Structrant (%) | 0.10 | 0.10 |
| Inventive polymer 1 (%) | 0.00 | 2.65 |
| Water (%) | balance | balance |
| ΔWI(CIE) versus reference on PE (100% polyester knit) | reference | 24.12 |

The whiteness maintenance Inventive polymer 1 is evaluated according to method for evaluating whiteness performance of polymers by comparing the cleaning performance of formula V and VI. Inventive polymer 1 deliver significant whiteness benefit, especially on synthetic (polyester) fabric.

Biodegradation Data

Biodegradation Test Method

The biodegradability of the polysaccharide derivative was determined following the OECD 301B Ready Biodegradability $CO_2$ Evolution Test Guideline. In this study, the test substance is the sole carbon and energy source and under aerobic conditions microorganisms metabolize the test substance producing $CO_2$ or incorporating the carbon into biomass. The amount of $CO_2$ produced by the test substance (corrected for the $CO_2$ evolved by the blank inoculum) is expressed as a percentage of the theoretical amount of $CO_2$ ($ThCO_2$) that could have been produced if the organic carbon in the test substance was completely converted to $CO_2$.

| Sample | Backbone | Modification | % $CO_2$ evolved |
|---|---|---|---|
| Example 8 from US 2020/002646 | Alpha-1,6 backbone, 25% branching, 17K | Tosyl (0.2) SSO4 (0.5) | 28% (28 days) |
| Example 13B from US 2020/002646 | Alpha-1,3, 120K | Benzyl (0.5) —$CH_2$—COOH (0.5) | −2.5% (28 days) |
| Inventive polymer example 1 | Alpha 1,3, 120K | Benzoyl/acetyl ester (0.20/0.08) | 73.6% (28 days) |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

What is claimed is:

1. A laundry detergent composition comprising:

(i) detersive surfactant at 10 to 40 percent by weight of the laundry detergent composition; and (ii) polyalpha-1,3-glucan ester compound at 0.1 to 10 percent by weight of the laundry detergent composition, the polyalpha-1,3-glucan ester compound comprising poly alpha-1,3 glucan backbone and ester group modification, wherein the poly alpha-1,3 glucan backbone:

has less than about 10% branching point, and contains about 6 or more glucose units, wherein the ester group modification being one or more independently selected from:

(a) an acetyl;

(b) an aryl ester group;

(c) an acyl group

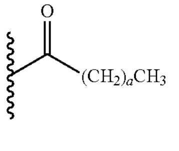

wherein a is independently about 6-24; and (d) an acyl group

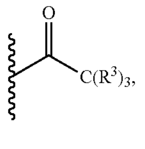

wherein $R^3$ can be independently selected from H atoms, linear alkyl groups, branched alkyl groups, cyclic alkyl groups, and aryl groups comprising from one to 24 carbon atoms, and wherein (d) is different from (a) and (c);

(e) an acyl group comprising —CO—$C_x$—$COOR^3$, wherein the —$C_x$— portion of the second acyl group comprises a chain of about 2 to about 24 carbon atoms, and $R^3$ comprises a chain of about 1 to about 24 carbon, with the proviso that (a) is present, and at least one other ester group (b), (c) (d) and/or (e) are present, and wherein the degree of substitution of the ester group modification is from about 0.001 to about 3.

2. A composition according to claim 1, wherein the poly alpha-1,3 glucan backbone is linear.

3. A laundry detergent composition according to claim 1, wherein the ester group modification comprises:

(a) an acetyl; and (b) an aryl ester group;

(c) an acyl group

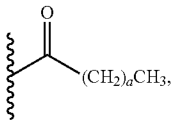

wherein a is independently about 6-24; and (d) any combination thereof.

4. A composition according to claim 3, wherein the ester group modification of the polyalpha-1,3-glucan ester compound is a combination of:

(a) an acetyl; and (b) an aryl ester group.

5. A composition according to claim 3, wherein the ester group modification of the polyalpha-1,3-glucan ester compound is a combination of:

(a) an acetyl; and (b) a benzoyl.

6. A composition according to claim 1, wherein the polyalpha-1,3-glucan ester compound has a degree of substitution for the ester group modification of from about 0.02 to about 0.8.

7. A composition according to claim 1, wherein a is independently about 9-16.

8. A composition according to claim 1, wherein the composition comprises polyalpha-1,3-glucan ester compound and enzymes.

9. A composition according to claim 1, wherein the composition is a liquid laundry detergent composition.

10. A composition according to claim 1, wherein the composition is a soluble unit dose laundry detergent composition.

11. A composition according to claim 1 wherein the composition is a powder laundry detergent composition.

12. A composition according to claim 1 wherein the composition is in the form of a sheet.

* * * * *